US012803995B2

(12) United States Patent
Uzelac et al.

(10) Patent No.: US 12,803,995 B2
(45) Date of Patent: *Nov. 17, 2026

(54) FRAUD OR DISTRIBUTED DENIAL OF SERVICE (DDOS) PROTECTION FOR SESSION INITIATION PROTOCOL (SIP)-BASED COMMUNICATION

(71) Applicant: Level 3 Communications, LLC, Denver, CO (US)

(72) Inventors: Adam Uzelac, Rochester, NY (US); Ronnie Bailey, Lakewood, CO (US); Craig Richter, Marlboro, NY (US)

(73) Assignee: Level 3 Communications, LLC, Denver, CO (US)

(*) Notice: Subject to any disclaimer, the term of this patent is extended or adjusted under 35 U.S.C. 154(b) by 15 days.

This patent is subject to a terminal disclaimer.

(21) Appl. No.: 19/093,927

(22) Filed: Mar. 28, 2025

(65) Prior Publication Data

US 2025/0227118 A1 Jul. 10, 2025

Related U.S. Application Data

(63) Continuation of application No. 18/611,189, filed on Mar. 20, 2024, now Pat. No. 12,267,342, which is a
(Continued)

(51) Int. Cl.
*H04L 29/00* (2006.01)
*H04L 9/40* (2022.01)
*H04L 65/1104* (2022.01)

(52) U.S. Cl.
CPC ...... *H04L 63/1416* (2013.01); *H04L 63/1425* (2013.01); *H04L 63/1458* (2013.01); *H04L 63/1466* (2013.01); *H04L 65/1104* (2022.05)

(58) Field of Classification Search
CPC ............. H04L 63/1416; H04L 63/1425; H04L 63/1458; H04L 63/1466; H04L 65/1104
See application file for complete search history.

(56) References Cited

U.S. PATENT DOCUMENTS 8,689,328 B2 * 4/2014 Ormazabal ......... H04L 63/1458 726/22
8,719,926 B2 * 5/2014 Ormazabal ......... H04L 63/1458 709/227

(Continued)

*Primary Examiner* — Don G Zhao

(57) ABSTRACT

Novel tools and techniques are provided for implementing fraud or distributed denial of service ("DDoS") protection for session initiation protocol ("SIP")-based communication. In various embodiments, a computing system may receive, from a first router, first SIP data indicating a request to initiate a SIP-based media communication session between a calling party at a source address and a called party at a destination address. The computing system may analyze the received first SIP data to determine whether the received first SIP data comprises any abnormalities indicative of potential fraudulent or malicious actions. If so, the computing system may reroute the first SIP data to a security deep packet inspection ("DPI") engine, which may perform a deep scan of the received first SIP data to identify any known fraudulent or malicious attack vectors contained within the received first SIP data. If so, the security DPI engine may initiate mitigation actions.

16 Claims, 12 Drawing Sheets

Related U.S. Application Data continuation of application No. 17/410,214, filed on Aug. 24, 2021, now Pat. No. 11,943,239.

(60) Provisional application No. 63/226,515, filed on Jul. 28, 2021.

(56) References Cited

U.S. PATENT DOCUMENTS

| | | | | |
|---|---|---|---|---|
| 8,984,627 | B2 * | 3/2015 | Ormazabal | H04L 63/1458 726/13 |
| 9,148,453 | B1 * | 9/2015 | Pankajakshan | H04L 65/1076 |
| 10,462,190 | B1 * | 10/2019 | Myers | G06F 9/45558 |
| 11,218,516 | B1 * | 1/2022 | Velusamy | H04L 65/80 |
| 11,451,563 | B2 * | 9/2022 | Rajaram | H04L 63/1416 |
| 11,943,239 | B2 * | 3/2024 | Uzelac | H04L 63/1425 |
| 12,267,342 | B2 * | 4/2025 | Uzelac | H04L 65/1104 |
| 2007/0206617 | A1 * | 9/2007 | Andreasen | G06Q 20/102 370/401 |
| 2008/0062985 | A1 * | 3/2008 | Agarwal | H04L 65/1046 370/392 |
| 2009/0288165 | A1 * | 11/2009 | Qiu | H04L 63/10 726/23 |
| 2010/0054257 | A1 * | 3/2010 | Dolganow | H04L 65/80 370/395.21 |
| 2010/0142382 | A1 * | 6/2010 | Jungck | H04L 63/123 370/242 |
| 2010/0192225 | A1 * | 7/2010 | Ma | H04L 63/1416 709/224 |
| 2011/0231924 | A1 * | 9/2011 | Devdhar | H04L 63/0236 726/11 |
| 2012/0147753 | A1 * | 6/2012 | Jayawardena | H04L 41/5022 370/238 |
| 2012/0210007 | A1 * | 8/2012 | Ormazabal | H04L 65/1104 709/227 |
| 2012/0297457 | A1 * | 11/2012 | Schulte | H04L 65/1069 726/4 |
| 2016/0050229 | A1 * | 2/2016 | Patel | H04L 65/1079 726/23 |
| 2016/0105468 | A1 * | 4/2016 | Mufti | H04L 65/80 709/228 |
| 2016/0119314 | A1 * | 4/2016 | Uzelac | H04L 63/0807 726/6 |
| 2016/0119315 | A1 * | 4/2016 | Uzelac | H04L 65/4038 709/204 |
| 2016/0253651 | A1 | 9/2016 | Park | |
| 2017/0026334 | A1 * | 1/2017 | Youn | H04L 61/5007 |
| 2017/0099310 | A1 * | 4/2017 | Di Pietro | H04L 63/1425 |
| 2017/0104795 | A1 * | 4/2017 | Gundavelli | H04L 65/1104 |
| 2017/0237710 | A1 * | 8/2017 | Mayya | G06N 20/00 726/13 |
| 2017/0257348 | A1 * | 9/2017 | Jain | H04L 63/0254 |
| 2017/0257388 | A1 * | 9/2017 | Addepalli | G06N 20/00 |
| 2018/0241615 | A1 * | 8/2018 | Livanos | H04L 41/0668 |
| 2018/0309795 | A1 * | 10/2018 | Ithal | H04L 63/20 |
| 2019/0068626 | A1 * | 2/2019 | Compton | H04L 63/1416 |
| 2020/0067974 | A1 * | 2/2020 | Konda | H04L 41/145 |
| 2020/0382537 | A1 * | 12/2020 | Compton | H04L 63/1416 |
| 2021/0112091 | A1 * | 4/2021 | Compton | H04L 63/1416 |
| 2023/0029971 | A1 * | 2/2023 | Uzelac | H04L 63/1458 |
| 2024/0259403 | A1 * | 8/2024 | Uzelac | H04L 63/1425 |
| 2025/0227118 | A1 * | 7/2025 | Uzelac | H04L 63/1416 |
| 2026/0095469 | A1 * | 4/2026 | White | H04L 63/02 |

* cited by examiner

FRAUD OR DISTRIBUTED DENIAL OF SERVICE (DDOS) PROTECTION FOR SESSION INITIATION PROTOCOL (SIP)-BASED COMMUNICATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing call or data routing, and, more particularly, to methods, systems, and apparatuses for implementing fraud or distributed denial of service ("DDoS") protection for session initiation protocol ("SIP")-based communication.

BACKGROUND

Conventional session initiation protocol ("SIP")-based communications (including, voice over Internet Protocol ("VoIP") communications, IP-based video communications, or an instant messages over IP, and/or the like) are susceptible to fraudulent and/or malicious actions (e.g., distributed denial of service ("DDoS") or the like). Such fraudulent and/or malicious actions can substantially impact customer SIP-based communications and/or disrupt service provide network operations.

Hence, there is a need for more robust and scalable solutions for implementing call or data routing, and, more particularly, to methods, systems, and apparatuses for implementing fraud or DDoS protection for SIP-based communication.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
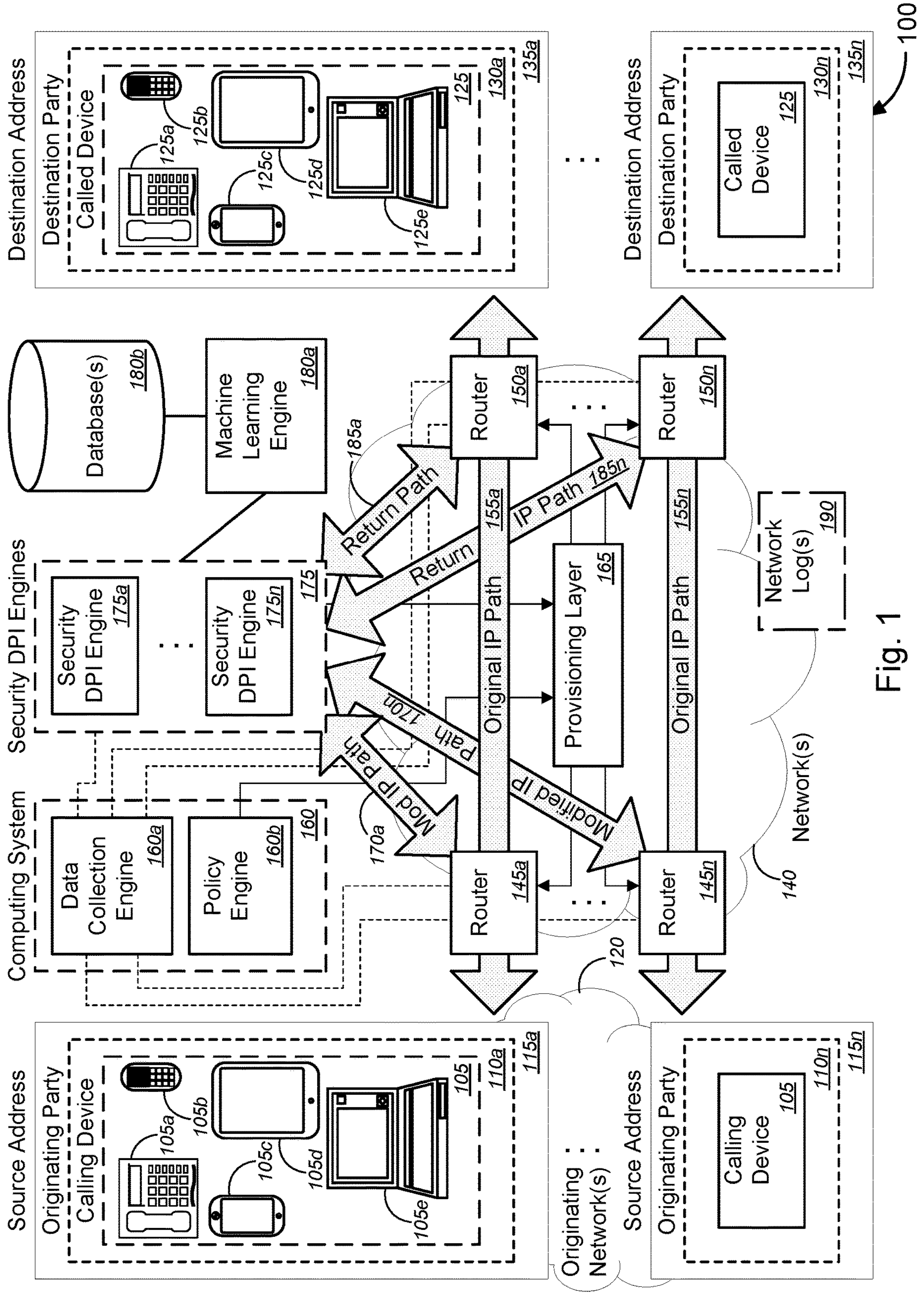
FIG. 1 is a schematic diagram illustrating a system for implementing fraud or distributed denial of service ("DDoS") protection for session initiation protocol ("SIP")-based communication, in accordance with various embodiments.

Various embodiments provide tools and techniques for implementing call or data routing, and, more particularly, to methods, systems, and apparatuses for implementing fraud or distributed denial of service ("DDoS") protection for session initiation protocol ("SIP")-based communication.

In various embodiments, a computing system may receive, from a first router in a network(s), first SIP data, the first SIP data indicating a request to initiate a SIP-based media communication session between a calling party at a source address in an originating network and a called party at a destination address in the network. In some embodiments, the SIP-based media communication may include, without limitation, at least one of a voice over Internet Protocol ("VoIP") call, an IP-based video call, or an instant message over IP, and/or the like.

The computing system may analyze the received first SIP data to determine whether the received first SIP data comprises any abnormalities indicative of potential fraudulent or malicious actions. In some instances, the potential fraudulent or malicious actions may include, but are not limited to, at least one of one or more attacks to obtain fraudulent access, one or more denial of service ("DoS") attacks, one or more DDos attacks, or one or more user datagram protocol ("UDP") attacks (which may be a form of volumetric DDoS attack), and/or the like.

Based on a determination that the received first SIP data does not comprise at least one abnormality indicative of potential fraudulent or malicious actions, the computing system may establish a media communication session between the calling party and the called party. On the other hand, based on a determination that the received first SIP data comprises at least one abnormality indicative of potential fraudulent or malicious actions, the computing system may reroute the first SIP data to a security deep packet inspection ("DPI") engine. The security DPI engine may perform a deep scan of the received first SIP data to identify any known fraudulent or malicious attack vectors contained within the received first SIP data and to determine whether the calling party is a known malicious entity or whether the source address is associated with a known malicious entity.

In the case that the deep scan of the received first SIP data does not reveal or identify any known fraudulent or malicious attack vectors contained within the received first SIP data, does not reveal or identify the calling party as a known malicious entity, and/or or does not reveal or identify the source address as being associated with a known malicious entity, then the security DPI engine may establish a media communication session between the calling party and the called party.

On the other hand, in the case that the deep scan of the received first SIP data reveals or identifies at least one known fraudulent or malicious attack vector contained within the received first SIP data, then the security DPI engine may initiate one or more mitigation actions.

According to some embodiments, the computing system and/or the security DPI engine may normalize all network traffic to the destination address (e.g., from source address) either after a predetermined period and/or after a predetermined number of SIP data checks showing no abnormalities indicative of potential fraudulent or malicious actions.

These and other aspects of the fraud or DDoS protection system and method for SIP-based communication are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, call routing technology, call routing management technology, data routing technology, data routing management technology, network management technology, communication fraud protection technology, DOS protection technology, and/or the like. In other aspects, certain embodiments, can improve the functioning of user equipment or systems themselves (e.g., call routing systems, call routing management systems, data routing systems, data routing management systems, network management systems, communication fraud protection systems, DOS protection systems, etc.), for example, by receiving, using a computing system and from a first router among a plurality of routers in a network, first session initiation protocol ("SIP") data, the first SIP data indicating a request to initiate a SIP-based media communication session between a calling party at a source address in an originating network and a called party at a destination address in the network; analyzing, using the computing system, the received first SIP data to determine whether the received first SIP data comprises any abnormalities indicative of potential fraudulent or malicious actions; based on a determination that the received first SIP data comprises at least one abnormality indicative of potential fraudulent or malicious actions, rerouting, using the computing system, the first SIP data to a security deep packet inspection ("DPI") engine; performing, using the security DPI engine, a deep scan of the received first SIP data to identify any known fraudulent or malicious attack vectors contained within the received first SIP data and to determine whether the calling party is a known malicious entity or whether the source address is associated with a known malicious entity; and in response to the security DPI engine identifying at least one known fraudulent or malicious attack vector contained within the received first SIP data, initiating one or more mitigation actions; and/or the like.

In particular, to the extent any abstract concepts are present in the various embodiments, those concepts can be implemented as described herein by devices, software, systems, and methods that involve specific novel functionality (e.g., steps or operations), such as, analyzing the received first SIP data to determine whether the received first SIP data comprises any abnormalities indicative of potential fraudulent or malicious actions; based on a determination that the received first SIP data comprises at least one abnormality indicative of potential fraudulent or malicious actions, rerouting the first SIP data to a security DPI engine; performing a deep scan of the received first SIP data to identify any known fraudulent or malicious attack vectors contained within the received first SIP data and to determine whether the calling party is a known malicious entity or whether the source address is associated with a known malicious entity; and in response to the security DPI engine identifying at least one known fraudulent or malicious attack vector contained within the received first SIP data, initiating one or more mitigation actions; and/or the like, to name a few examples, that extend beyond mere conventional computer processing operations. These functionalities can produce tangible results outside of the implementing computer system, including, merely by way of example, optimized screening of SIP-based requests and data to identify potential fraudulent and/or malicious actions, optimized deep scans of SIP-based requests to identify potential fraudulent or malicious attack vectors, automatic routing or rerouting of SIP requests, and automatic initiation of mitigation actions, and/or the like, at least some of which may be observed or measured by customers and/or service providers.

In an aspect, a method may comprise receiving, using a computing system and from a first router among a plurality of routers in a network, first session initiation protocol ("SIP") data, the first SIP data indicating a request to initiate a SIP-based media communication session between a calling party at a source address in an originating network and a called party at a destination address in the network; analyzing, using the computing system, the received first SIP data to determine whether the received first SIP data comprises any abnormalities indicative of potential fraudulent or malicious actions; based on a determination that the received first SIP data comprises at least one abnormality indicative of potential fraudulent or malicious actions, rerouting, using the computing system, the first SIP data to a security deep packet inspection ("DPI") engine; performing, using the security DPI engine, a deep scan of the received first SIP data to identify any known fraudulent or malicious attack vectors contained within the received first SIP data and to determine whether the calling party is a known malicious entity or whether the source address is associated with a known malicious entity; and in response to the security DPI engine identifying at least one known fraudulent or malicious attack vector contained within the received first SIP data, initiating one or more mitigation actions.

Merely by way of example, in some cases, the computing system may comprise at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC, and/or the like. In some instances, the SIP-based communication may comprise at least one of a voice over Internet Protocol ("VoIP") call, an IP-based video call, or an instant message over IP, and/or the like.

In some embodiments, the method may further comprise receiving, using the computing system, continually collected data from the plurality of routers in the network; wherein continually collecting data from the plurality of routers in the network may comprise receiving the first SIP data from the first router in a continual, periodic, or sporadic manner, and/or the like. In some cases, each of the plurality of routers may employ active data collection to collect network traffic data, wherein the collected network traffic data may comprise SIP data and non-SIP data, and wherein each of the plurality of routers may provide the SIP data as the continually collected data to the computing system.

According to some embodiments, analyzing the received first SIP data may comprise analyzing, using the computing system, the received first SIP data based at least in part on information regarding packets sent from the source address, to determine whether the received first SIP data comprises any abnormalities indicative of potential fraudulent or malicious actions, wherein the information regarding packets sent from the source address may comprise information including at least one of packet sizes of packets sent from the source address, frequency of packets sent from the source address, or types of packets sent from the source address, and/or the like. In some instances, the potential fraudulent or malicious actions may comprise at least one of one or more attacks to obtain fraudulent access, one or more denial of service ("DoS") attacks, one or more distributed denial of service ("DDos") attacks, or one or more user datagram protocol ("UDP") attacks, and/or the like.

In some embodiments, rerouting the first SIP data to the security DPI engine may comprise sending, using the computing system, routing updates to one or more routers, via a provisioning layer of the network, to route the first SIP data from the source address, wherein the routing updates may be constructed such that latency is minimized, available capacity of the security DPI engine is taken into account, and there is no single points of failure. Alternatively, or additionally, rerouting the first SIP data to the security DPI engine may comprise: identifying, using the computing system, one or more security DPI engines among a plurality of security DPI engines in the network to reroute the first SIP data; selecting, using the computing system, a first security DPI engine from the identified one or more security DPI engines, based at least in part on at least one of proximity of each of the one or more security DPI engines to the destination address, latency caused by rerouting data to each of the one or more security DPI engines, available capacity of each of the one or more security DPI engines, or identification of points of failure due to selection of each of the one or more security DPI engines; and rerouting, using the computing system, the first SIP data to the selected first security DPI engine.

According to some embodiments, the computing system may comprise a data collection engine and a policy engine, wherein receiving the first SIP data may be performed by the data collection engine, and wherein analyzing and rerouting the received first SIP data may be performed by the policy engine.

Merely by way of example, in some instances, the one or more mitigation actions may comprise at least one of: rerouting or blocking any suspect network traffic to the destination address from the source address; rerouting or blocking all network traffic to the destination address from the source address; rerouting or blocking any suspect network traffic to all destinations from the source address; rerouting or blocking all network traffic to all destinations from the source address; rerouting or blocking any suspect network traffic to all destinations from one or more source addresses associated with the calling party or associated with an entity associated with the source address; or rerouting or blocking all network traffic to all destinations from one or more source addresses associated with the calling party or associated with the entity associated with the source address; and/or the like.

In some embodiments, at least one of identifying any known fraudulent or malicious attack vectors contained within the received first SIP data, determining whether the calling party is a known malicious entity or whether the source address is associated with a known malicious entity, or initiating the one or more mitigation actions may be performed using at least in part a machine learning engine. In some cases, the method may further comprise recording an event to the machine learning engine in response to at least one of identifying any known fraudulent or malicious attack vectors contained within the received first SIP data, determining whether the calling party is a known malicious entity or whether the source address is associated with a known malicious entity, or initiating the one or more mitigation actions, and/or the like. In some instances, the method may further comprise normalizing, using the computing system and after initiating the one or more mitigation actions, all network traffic to the destination address after at least one of a predetermined period or a predetermined number of SIP data checks showing no abnormalities indicative of potential fraudulent or malicious actions. According to some embodiments, the method may further comprise sending, using the computing system, a report to a system log in response to at least one of: rerouting the first SIP data to the security DPI engine, performing the deep scan of the received first SIP, initiating the one or more mitigation actions, recording an event to the machine learning engine, or normalizing the network traffic to the destination address, and/or the like.

In another aspect, a system might comprise a computing system and a first security deep packet inspection ("DPI") engine among a plurality of security DPI engines. The computing system may comprise a data collection engine; a policy engine; at least one first processor; and a first non-transitory computer readable medium communicatively coupled to the at least one first processor. The first non-transitory computer readable medium might have stored thereon computer software comprising a first set of instructions that, when executed by the at least one first processor, causes the computing system to: receive, using the data collection engine and from a first router among a plurality of routers in a network, first session initiation protocol ("SIP") data, the first SIP data indicating a request to initiate a SIP-based media communication session between a calling party at a source address in an originating network and a called party at a destination address in the network; analyze, using the policy engine, the received first SIP data to determine whether the received first SIP data comprises any abnormalities indicative of potential fraudulent or malicious actions; and based on a determination that the received first SIP data comprises at least one abnormality indicative of potential fraudulent or malicious actions, rerouting, using the policy engine, the first SIP data to the first security DPI engine.

The first security DPI engine may comprise at least one second processor and a second non-transitory computer readable medium communicatively coupled to the at least one second processor. The second non-transitory computer readable medium might have stored thereon computer software comprising a second set of instructions that, when executed by the at least one second processor, causes the first security DPI engine to: perform a deep scan of the received first SIP data to identify any known fraudulent or malicious attack vectors contained within the received first SIP data and to determine whether the calling party is a known malicious entity or whether the source address is associated with a known malicious entity; and in response to the security DPI engine identifying at least one known fraudulent or malicious attack vector contained within the received first SIP data, initiating one or more mitigation actions.

In some embodiments, the computing system may comprise at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC, and/or the like.

Merely by way of example, in some cases, the one or more mitigation actions may comprise at least one of: rerouting or blocking any suspect network traffic to the destination address from the source address; rerouting or blocking all network traffic to the destination address from the source address; rerouting or blocking any suspect network traffic to all destinations from the source address; rerouting or blocking all network traffic to all destinations from the source address; rerouting or blocking any suspect network traffic to all destinations from one or more source addresses associated with the calling party or associated with an entity associated with the source address; or rerouting or blocking all network traffic to all destinations from one or more source addresses associated with the calling party or associated with the entity associated with the source address; and/or the like.

According to some embodiments, at least one of identifying any known fraudulent or malicious attack vectors contained within the received first SIP data, determining whether the calling party is a known malicious entity or whether the source address is associated with a known malicious entity, or initiating the one or more mitigation actions may be performed using at least in part a machine learning engine.

In some embodiments, one of the first set of instructions, when executed by the at least one first processor, further causes the computing system to or the second set of instructions, when executed by the at least one second processor, causes the first security DPI engine to: normalize, after initiating the one or more mitigation actions, all network traffic to the destination address after at least one of a predetermined period or a predetermined number of SIP data checks showing no abnormalities indicative of potential fraudulent or malicious actions.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-6 illustrate some of the features of the method, system, and apparatus for implementing call or data routing, and, more particularly, to methods, systems, and apparatuses for implementing fraud or distributed denial of service ("DDoS") protection for session initiation protocol ("SIP")-based communication, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing fraud or distributed denial of service ("DDoS") protection for session initiation protocol ("SIP")-based communication, in accordance with various embodiments.

In the non-limiting embodiment of FIG. 1, system 100 may comprise a calling device 105 that is associated with an originating party 110*a* among a plurality of originating parties 110*a*-110*n* (collectively, "originating parties 110" or "calling parties 110" or the like) at corresponding source addresses 115*a*-115*n* (collectively, "source addresses 115" or the like) in an originating network(s) 120. In some instances, the calling device 105 (also referred to as a "user device 105" or the like) may include, but is not limited to, at least one of a telephone 105*a*, a mobile phone 105*b*, a smart phone 105*c*, a tablet computer 105*d*, or a laptop computer 105*e*, and/or the like. System 100 likewise may comprise a called device 125 that is associated with a destination party 130*a* among a plurality of destination parties 130*a*-130*n* (collectively, "destination parties 130" or "called parties 130" or the like) at corresponding destination addresses 135*a*-135*n* (collectively, "destination addresses 135" or the like) in a network(s) 140. In some instances, the called device 125 (also referred to as a "user device 125" or the like), similar to calling device 105, may include, but is not limited to, at least one of a telephone 125*a*, a mobile phone 125*b*, a smart phone 105*c*, a tablet computer 105*d*, or a laptop computer 105*e*, and/or the like.

According to some embodiments, networks 120 and 140 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the networks 120 and 140 may include an access network of the service provider (e.g., an Internet service provider ("ISP")). In another embodiment, the networks 120 and 140 may include a core network of the service provider and/or the Internet.

System 100 may further comprise a plurality of routers 145*a*-145*n* (collectively, "routers 145" or the like) that receives network traffic into network(s) 140 from at least one of calling devices 105, source addresses 115*a*-115*n*, and/or originating network(s) 120, while sending network traffic from network(s) 140 to at least one of calling devices 105, source addresses 115*a*-115*n*, and/or originating network(s) 120. System 100 may further comprise a plurality of routers 150*a*-150*n* (collectively, "routers 150" or the like) that relays network traffic within network(s) 140 to at least one of called devices 125 and/or destination addresses 135*a*-135*n*, while receiving network traffic from at least one of called devices 125 and/or destination addresses 135*a*-135*n*. Routers 145 and routers 150 may otherwise be similar, if not identical, to each other in terms of functionality, configurations, and/or form-factor, or the like.

According to some embodiments, system 100 may further comprise a computing system 160, which may include, without limitation, at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC, and/or the like. In some instances, the computing system 160 may further include, but is not limited to, a data collection engine 160*a* and a policy engine 160*b*, and/or the like. System 100 may further comprise a provisioning layer 165, a plurality of security deep packet inspection ("DPI") engines 175*a*-175*n* (collectively, "security DPI engines 175," or the like), and a machine learning engine 180*a* and corresponding database(s) 180*b*.

The data collection engine 160*a* may be configured to collect network traffic data, while the policy engine 160*b* may be configured to analyze SIP data and to reroute the SIP data to a security DPI engine 175 for a deep scan in the case the policy engine 160*b* encounters, discovers, or identifies signs or indications of potential fraudulent or malicious actions when analyzing the SIP data, or the like. The provisioning layer 165 may be configured to send instructions to one or more routers 145 and/or one or more routers 150 to control routing of network traffic data within network(s) 140. Each security DPI engine 175 may be configured to perform a deep scan of SIP requests or SIP data (a) to identify any known fraudulent or malicious attack vectors contained within the SIP request or SIP data, (b) to determine whether the calling party is a known malicious entity, and/or (c) to determine whether the source address is associated with a known malicious entity, or the like, and may also be configured to initiate one or more mitigation actions, such as those described below with reference to FIG. 3 (although not limited to those mitigation actions). Machine learning engine 180*a* may be configured (1) to aid or assist the security DPI engines 175 in performing the one or more mitigation actions, (2) to aid or assist the security DPI engines 175 in analyzing the SIP requests or SIP data to identify any known fraudulent or malicious attack vectors, and (3) to aid or assist the security DPI engines 175 in identifying any known bad actors or known malicious entities involved with sending the SIP requests or SIP data, and/or the like. Database(s) 180*b* may be used by machine learning engine 180*a* to store, to search for, and to add at least one of (A) information regarding configurations and implementations for each of the one or more mitigation actions, (B) information regarding known fraudulent or malicious SIP-based attack vectors, and/or (C) information regarding known bad actors or known malicious entities, and/or the like.

In some cases, each of the plurality of routers 145 and/or 150 may employ active data collection to collect network traffic data. The collected network traffic data may include, but is not limited to, SIP data and non-SIP data, and each of the plurality of routers 145 and/or 150 may provide the SIP data as continually collected data to the computing system 160 and/or the data collection engine 160*a*, where continually collecting data from the plurality of routers in the network comprises receiving the SIP data from each router in a continual, periodic, or sporadic manner, or the like.

In some embodiments, system 100 may further comprise one or more network or system logs 190 configured to receive and store logs pertaining to at least one of each instance that a SIP request or data is rerouted to one of the security DPI engines 175 for a deep scan, each instance that a deep scan is performed on a SIP request or data by one of the security DPI engines 175, each instance of one or more mitigation actions being initiated, each instance of an event being recorded to the machine learning engine, each instance of network traffic to a destination address 135*a*-135*n* being normalized after mitigation actions have been initiated and after a suitable amount of time has elapsed and/or after a suitable number of subsequent checks of SIP requests or data have been performed, and/or the like.

In operation, each of routers 145*a*-145*n* and each of routers 150*a*-150*n* may employ active data collection to continually, periodically, or sporadically collect network traffic data, which may include, but is not limited to SIP data and non-SIP data. Computing system 160 and/or data collection engine 160*a* of computing system 160 may continually collect data from the plurality of routers 145 and 150 (depicted in FIG. 1 by short dash lines between data collection engine 160*a* and each of routers 145*a*-145*n* and 150*a*-150*n*), by receiving SIP data from the plurality of routers 145 and 150 in a continual, periodic, or sporadic manner. In some cases, computing system 160 and/or data collection engine 160*a* may continually collect data from one or more of the plurality of security DPI engines 175*a*-

175*n* (also depicted in FIG. 1 by short dash lines, in this case, between data collection engine 160*a* and security DPI engines 175).

Computing system 160 and/or data collection engine 160*a* may receive, from a first router 145*a* among the plurality of routers 145 and 150 in network(s) 140, first SIP data, the first SIP data indicating a request to initiate a SIP-based media communication session between a calling party or originating party 110*a* at a source address 115*a* in originating network(s) 120 and a called party or destination party 130*a* at a destination address 135*a* in the network(s) 140. In some embodiments, the SIP-based media communication may include, without limitation, at least one of a voice over Internet Protocol ("VoIP") call, an IP-based video call, or an instant message over IP, and/or the like. In some cases, the network(s) 140 and the originating network(s) 120 may be the same network (operated by the same service provider). Alternatively, the network(s) 140 and the originating network(s) 120 may be different networks (either operated by the same service provider or operated by different service providers). Although not shown in FIG. 1, one or more session border controllers ("SBCs") may be deployed to protect network(s) 140 and may be disposed between originating network(s) 120 and network(s) 140, particularly in the case that originating network(s) 120 and network(s) 140 are different network(s) and/or operated by different service providers. In the case that the destination address 135*a* is part of a customer network (e.g., local area network ("LAN") or the like), one or more other SBCs may also be deployed to protect network(s) 140 and may be disposed between network(s) 140 and the customer network (also not shown in FIG. 1).

Computing system 160 and/or policy engine 160*b* of computing system 160 may analyze the received first SIP data to determine whether the received first SIP data comprises any abnormalities indicative of potential fraudulent or malicious actions. According to some embodiments, analyzing the received first SIP data may comprise analyzing the received first SIP data based at least in part on information regarding packets sent from the source address, to determine whether the received first SIP data comprises any abnormalities indicative of potential fraudulent or malicious actions, where the information regarding packets sent from the source address may comprise information including at least one of packet sizes of packets sent from the source address, frequency of packets sent from the source address, or types of packets sent from the source address, and/or the like. In some instances, the potential fraudulent or malicious actions may include, but are not limited to, at least one of one or more attacks to obtain fraudulent access, one or more denial of service ("DoS") attacks, one or more distributed denial of service ("DDos") attacks, or one or more user datagram protocol ("UDP") attacks (which may be a form of volumetric DDoS attack), and/or the like.

Based on a determination that the received first SIP data does not comprise at least one abnormality indicative of potential fraudulent or malicious actions, computing system 160 and/or policy engine 160*b* may establish a media communication session along an original Internet Protocol ("IP") path 155*a* (among a plurality of original IP paths 155*a*-155*n* in network(s) 140) between the calling party 110*a* and the called party 130*a*. On the other hand, based on a determination that the received first SIP data comprises at least one abnormality indicative of potential fraudulent or malicious actions, computing system 160 and/or policy engine 160*b* may reroute the first SIP data to a security DPI engine 175. In some embodiments, establishing the media communication session or rerouting the first SIP data to the security DPI engine may comprise computing system 160 and/or policy engine 160*b* sending routing updates to one or more routers 145*a*-145*n* and/or 150*a*-150*n*, via provisioning layer 165 of the network(s) 140 (depicted in FIG. 1 by the solid arrows from policy engine 160*b* to provisioning layer 165 to the routers 145*a*-145*n* and 150*a*-150*n*), to correspondingly establish the media communication session along the original IP path 155*a* or route the first SIP data from the source address 115*a* along modified IP path 170*a* (among a plurality of modified IP paths 170*a*-170*n* in network(s) 140) to a selected one of the security DPI engines 175*a*-175*n* (e.g., security DPI engine 175*a*). In at least the latter case, the routing updates are constructed such that (i) latency is minimized, (ii) available capacity of the security DPI engine is taken into account, and (iii) there is no single points of failure, or the like. To meet these conditions, the selected security DPI engine 175*a* may be the security DPI engine that is physically closest to destination address 135*a*. Alternatively, to meet these conditions, the selected security DPI engine 175*a* may be not be the nearest one to the destination address 135*a*, but may be selected because network connections between the selected security DPI engine 175*a* may provide from lower latency, the security DPI engine 175*b* that is physically closest to destination address 135*a* may lack the necessary capacity for performing a deep scan, and/or selecting the security DPI engine 175*b* that is physically closest to the destination address 135*a* may result in a single point of failure, or the like.

The selected security DPI engine 175*a* may perform a deep scan of the received first SIP data to identify any known fraudulent or malicious attack vectors contained within the received first SIP data and to determine whether the calling party is a known malicious entity or whether the source address is associated with a known malicious entity.

In the case that the deep scan of the received first SIP data does not reveal or identify any known fraudulent or malicious attack vectors contained within the received first SIP data, does not reveal or identify the calling party as a known malicious entity, and/or or does not reveal or identify the source address as being associated with a known malicious entity, then the selected security DPI engine 175*a* may establish a media communication session along original IP path 155*a* between the calling party 110*a* and the called party 130*a*, in some cases, by routing the first SIP data or SIP request 195 along return IP path 185*a* and via router 150*a* to the called party 130*a*. In some embodiments, establishing the media communication session may comprise the selected security DPI engine 175*a* either (A) directly sending routing updates to one or more routers 145*a*-145*n* and/or 150*a*-150*n*, via provisioning layer 165 of the network(s) 140 (depicted in FIG. 1 by the solid arrows from security DPI engine 175 to provisioning layer 165 to the routers 145*a*-145*n* and 150*a*-150*n*) or (B) indirectly communicating with computing system 160 and/or policy engine 160*b* to send routing updates to one or more routers 145*a*-145*n* and/or 150*a*-150*n*, via provisioning layer 165 of the network(s) 140 (depicted in FIG. 1 by the short dash line between security DPI engine 175 and data collection engine 160*a* of computing system 160 and by the solid arrows from policy engine 160*b* to provisioning layer 165 to the routers 145*a*-145*n* and 150*a*-150*n*), to correspondingly establish the media communication session along the original IP path 155*a*.

On the other hand, in the case that the deep scan of the received first SIP data reveals or identifies at least one known fraudulent or malicious attack vector contained within the received first SIP data, then the selected security DPI engine 175*a* may initiate one or more mitigation actions (which is shown in the non-limiting list provided in FIG. 3, for instance), including, but not limited to, at least one of: rerouting or blocking any suspect network traffic to the destination address 130*a* from the source address 115*a*; rerouting or blocking all network traffic to the destination address 130*a* from the source address 115*a*; rerouting or blocking any suspect network traffic to all destinations from the source address 115*a*; rerouting or blocking all network traffic to all destinations from the source address 115*a*; rerouting or blocking any suspect network traffic to all destinations from one or more source addresses 115*a*-115*x* associated with the calling party 110*a* or associated with an entity (not shown in FIG. 1) associated with the source address 115*a*; or rerouting or blocking all network traffic to all destinations from one or more source addresses 115*a*-115*x* associated with the calling party 110*a* or associated with an entity (not shown in FIG. 1) associated with the source address 115*a*; and/or the like.

In some embodiments, at least one of identifying any known fraudulent or malicious attack vectors contained within the received first SIP data, determining whether the calling party is a known malicious entity or whether the source address is associated with a known malicious entity, or initiating the one or more mitigation actions, and/or the like, may be performed using at least in part machine learning engine 180*a* (and corresponding database(s) 180*b*).

According to some embodiments, computing system 160, policy engine 160*b*, and/or security DPI engine 175*a* may normalize all network traffic to the destination address 135*a* (e.g., from source address 115*a*) either after a predetermined period (e.g., a set number of days, a set number of weeks, a set number of months, or longer, etc.) and/or after a predetermined number of SIP data checks (e.g., 5, 10, 15, 20, 25, 30, 35, 40, 45, 50, or more, etc.) showing no abnormalities indicative of potential fraudulent or malicious actions.

Merely by way of example, in some cases, computing system 160 and/or security DPI engine 175*a* may send a report to a system log(s) or network log(s) 190 in response to at least one of: rerouting the first SIP data to the security DPI engine, performing the deep scan of the received first SIP, initiating the one or more mitigation actions, recording an event to the machine learning engine, or normalizing the network traffic to the destination address, and/or the like.

These and other functions of the system 100 (and its components) are described in greater detail below with respect to FIGS. 2-4.

Figure 2A:
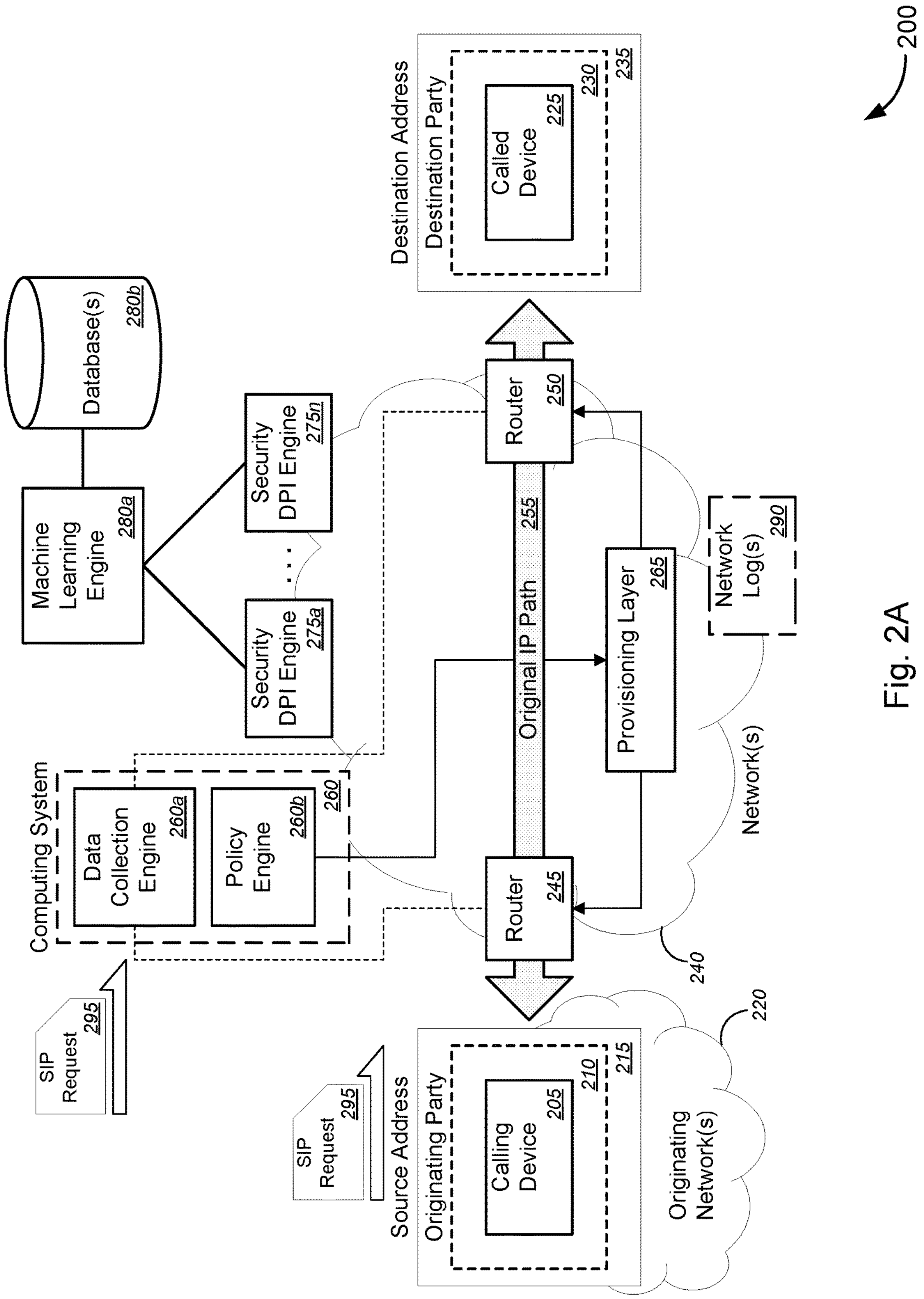
FIGS. 2A-2E are process flow diagrams illustrating a set of non-limiting examples of fraud or DDoS protection for SIP-based communication that may be implemented, in accordance with various embodiments.
Figure 2B:
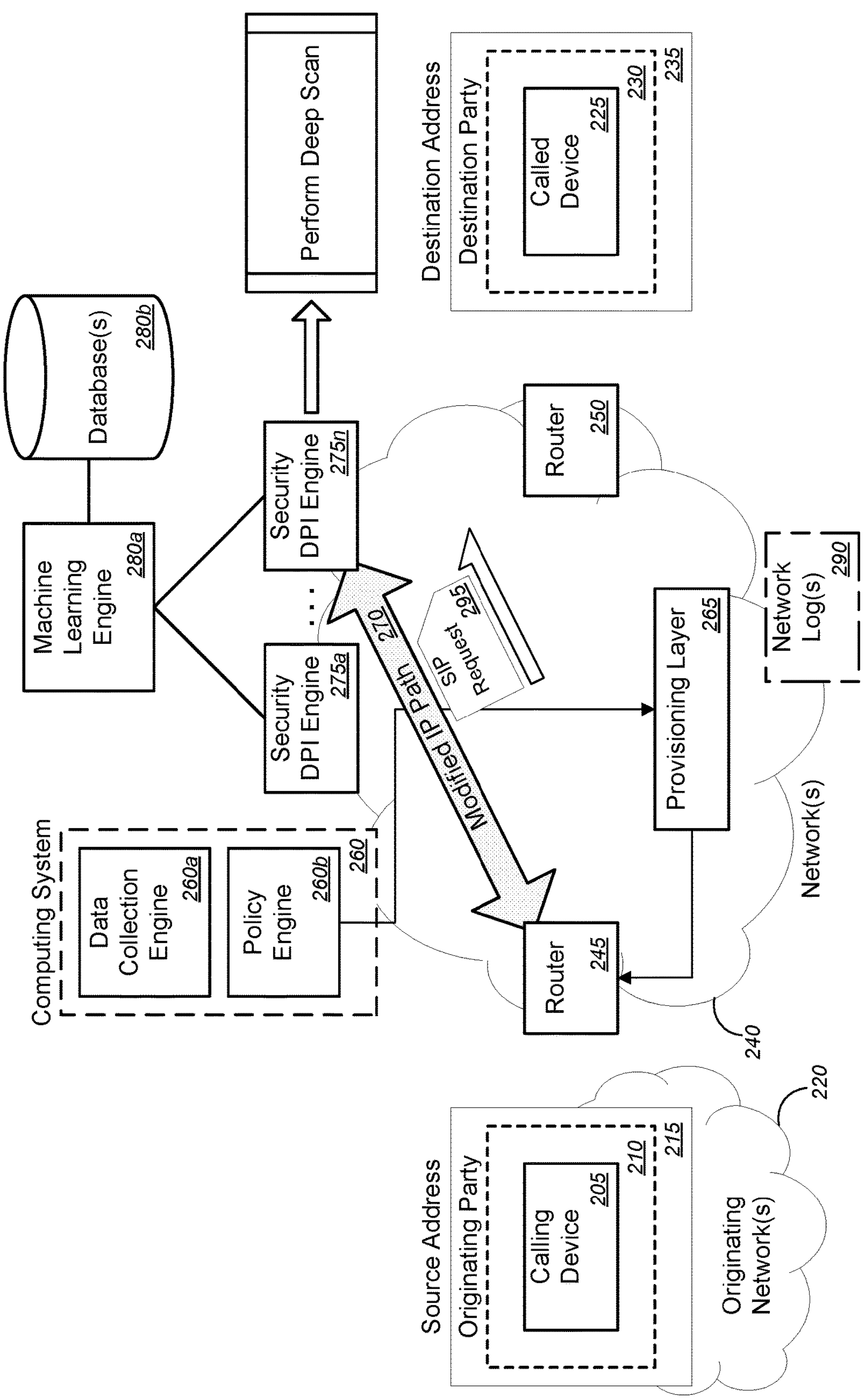
Figure 2C:
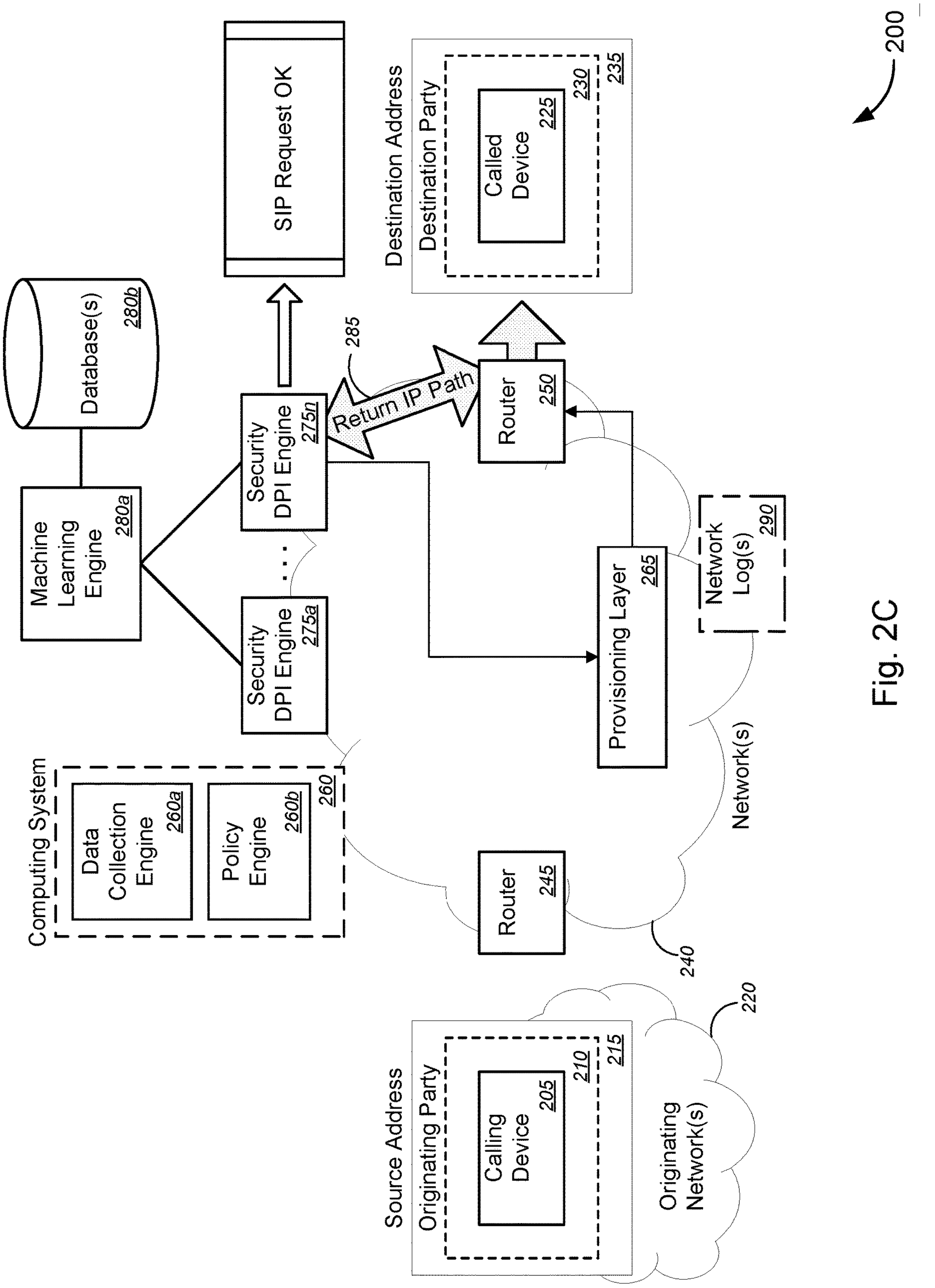
Figure 2D:
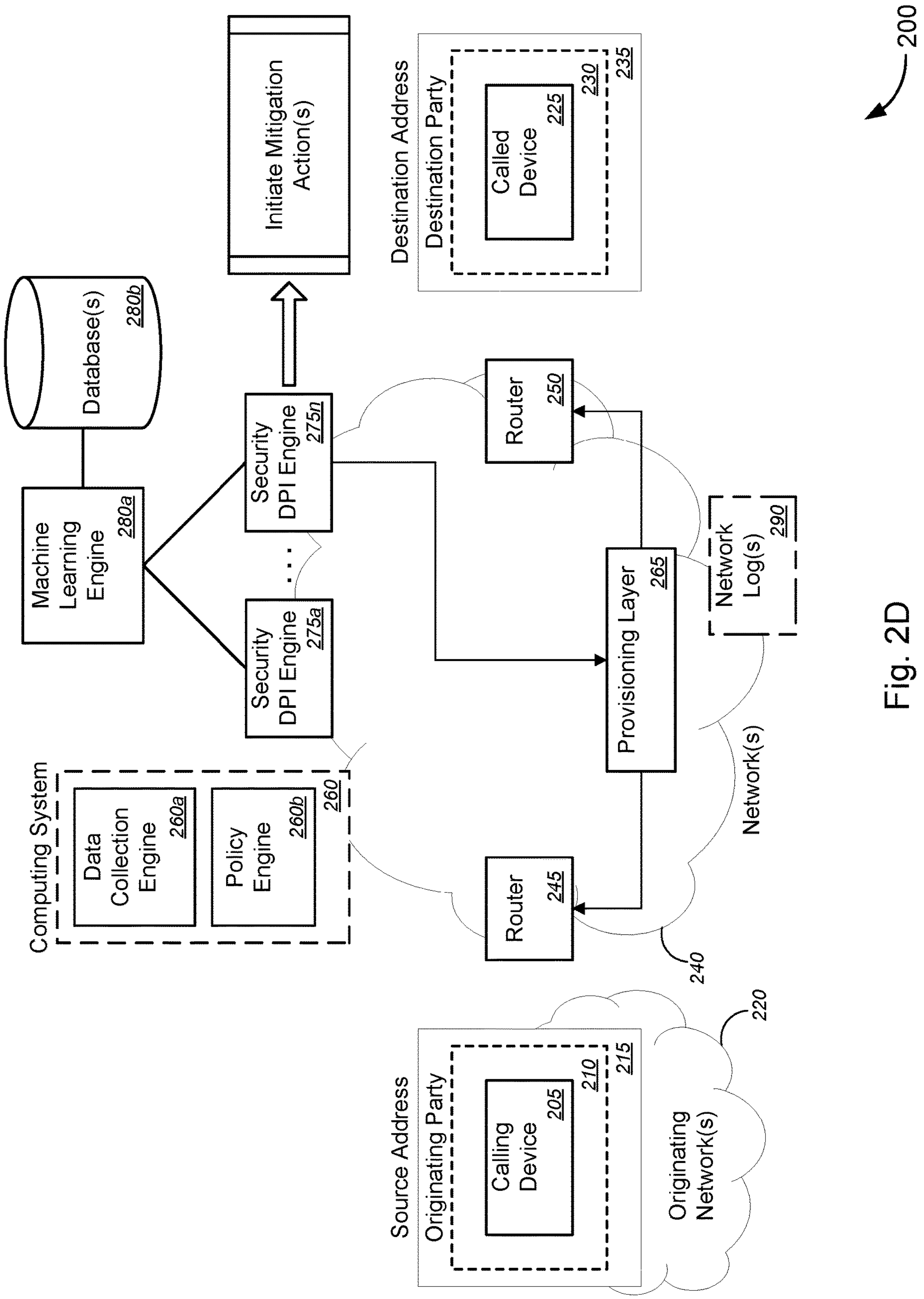
Figure 2E:
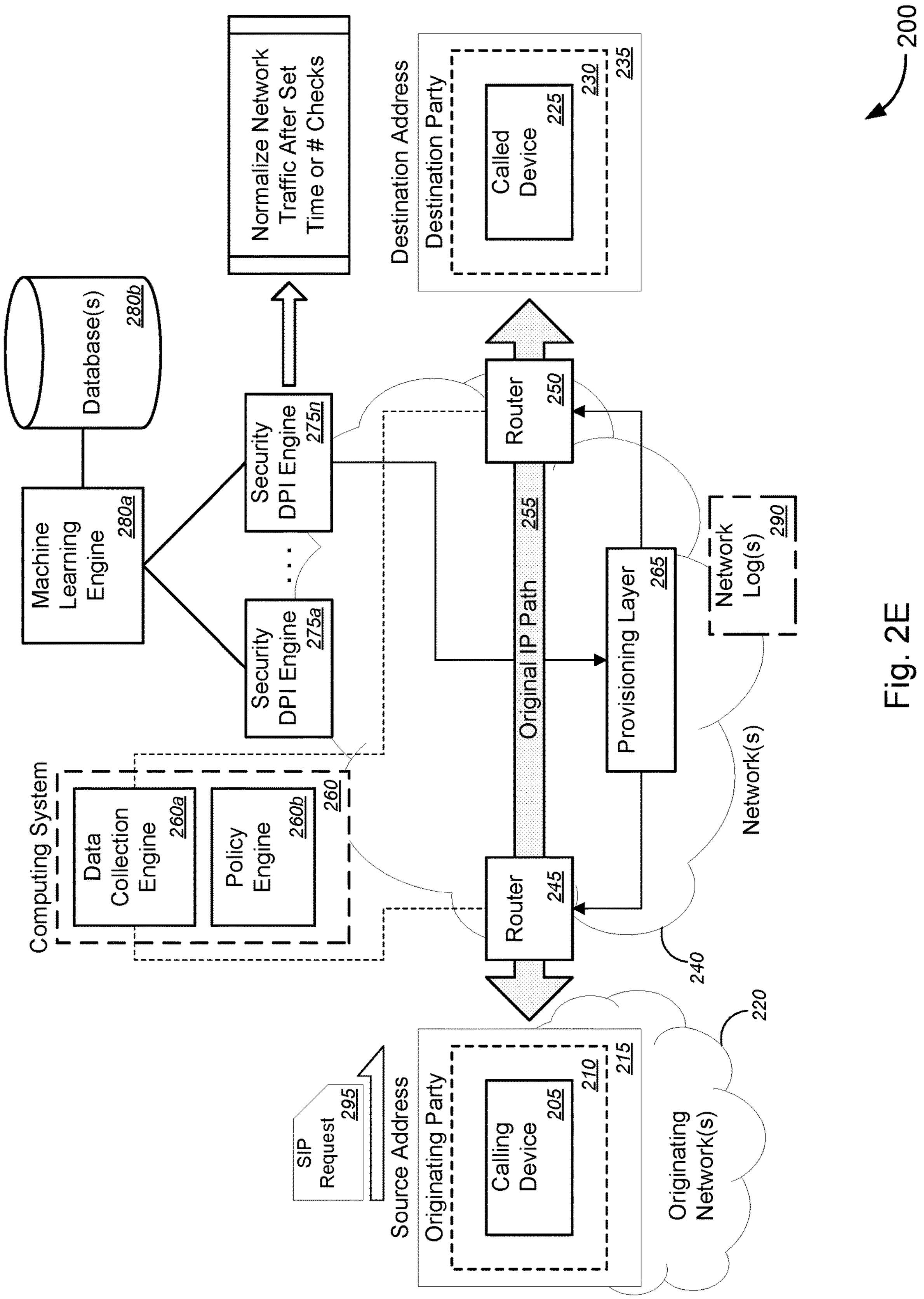

FIGS. 2A-2E (collectively, "FIG. 2") are process flow diagrams illustrating a set of non-limiting examples 200 of fraud or DDoS protection for SIP-based communication that may be implemented, in accordance with various embodiments. In particular, FIG. 2 depicts non-limiting examples of discrete aspects or portions of the fraud or DDoS protection for SIP-based communication that may be implemented, including, but not limited to, establishing a SIP-based media communication in response to determining an absence or lack of abnormalities in a SIP request or SIP data indicative of potential fraudulent or malicious actions (as shown in FIG. 2A); rerouting the SIP request or SIP data to a security DPI engine in response to determining presence of at least one abnormality in the SIP request or SIP data indicative of potential fraudulent or malicious actions (as shown in FIG. 2B); establishing a SIP-based media communication in response to determining an absence or lack of known fraudulent or malicious attack vectors (among other signs of fraud or attack) in the SIP request or SIP data after a deep scan of the SIP request or SIP data (as shown in FIG. 2C); initiating one or more mitigation actions in response to identifying at least one known fraudulent or malicious attack vector in the SIP request or SIP data (as shown in FIG. 2D); or normalizing all network traffic to the destination address after some conditions have been met (as shown in FIG. 2E); and/or the like.

The calling device 205, the originating party 210, the source address 215, the originating network(s) 220, the called device 225, the destination party 230, the destination address 235, the network(s) 240, the router 245, the router 250, the original IP Path 255, the computing system 260, the data collection engine 260*a*, the polity engine 260*b*, the provisioning layer 265, the modified IP path 270, the security DPI engines 275*a*-275*n*, the machine learning engine 280*a* and the corresponding database(s) 280*b*, the return IP path 285, and the network log(s) 290 of system 200 in FIGS. 2A-2E are otherwise similar, if not identical, to the calling device 105, the originating party 110*a*, the source address 115*a*, the originating network(s) 120, the called device 125, the destination party 130*a*, the destination address 135*a*, the network(s) 140, the router 145*a*, the router 150*a*, the original IP Path 155*a*, the computing system 160, the data collection engine 160*a*, the polity engine 160*b*, the provisioning layer 165, the modified IP path 170*a*, the security DPI engines 175*a*-175*n*, the machine learning engine 180*a* and the corresponding database(s) 180*b*, the return IP path 185*a*, and the network log(s) 190, respectively, of system 100 in FIG. 1, and the descriptions of these components of system 100 are applicable to the corresponding components of system 200, respectively.

Referring to FIG. 2A, each of routers 245 and 250 may employ active data collection to continually, periodically, or sporadically collect network traffic data, which may include, but is not limited to SIP data and non-SIP data. Computing system 260 and/or data collection engine 260*a* of computing system 260 may continually collect data from the plurality of routers 245 and 250 (depicted in FIG. 2A by short dash lines between data collection engine 260*a* and each of routers 245 and 250), by receiving SIP data from the plurality of routers 245 and 250 in a continual, periodic, or sporadic manner.

Computing system 260 and/or data collection engine 260*a* may receive, from a first router 245 in network(s) 240, first SIP data or SIP request 295, the first SIP data or SIP request 295 indicating a request to initiate a SIP-based media communication session between a calling party or originating party 210 at a source address 215 in originating network(s) 220 and a called party or destination party 230 at a destination address 235 in the network(s) 240.

Computing system 260 and/or policy engine 260*b* of computing system 260 may analyze the received first SIP data or SIP request 295 to determine whether the received first SIP data or SIP request 295 comprises any abnormalities indicative of potential fraudulent or malicious actions, as described in detail above with respect to FIG. 1.

Based on a determination that the received first SIP data or SIP request 295 does not comprise at least one abnormality indicative of potential fraudulent or malicious actions, computing system 260 and/or policy engine 260*b* may establish a media communication session along an original Internet Protocol ("IP") path 255 (among a plurality of original IP paths 215-215*n* in network(s) 240) between the calling party 210 and the called party 230. In some embodiments, as described above with respect to FIG. 1, establishing the media communication session may comprise computing system 260 and/or policy engine 260*b* sending routing updates to one or more routers 245 and/or 250, via provisioning layer 265 of the network(s) 240 (depicted in FIG. 2A by the solid arrows from policy engine 260*b* to provisioning layer 265 to the routers 245 and 250), to establish the media communication session along the original IP path 255.

On the other hand, with reference to FIG. 2B, based on a determination that the received first SIP data or SIP request 295 comprises at least one abnormality indicative of potential fraudulent or malicious actions, computing system 260 and/or policy engine 260*b* may reroute the first SIP data or SIP request 295 to a security DPI engine 275 (i.e., a selected one of security DPI engines 275*a*-275*n*). According to some embodiments, as described above with respect to FIG. 1, rerouting the first SIP data or SIP request 295 to the security DPI engine 275 may comprise computing system 260 and/or policy engine 260*b* sending routing updates to one or more routers 245 and/or 250, via provisioning layer 265 of the network(s) 240 (depicted in FIG. 2B by the solid arrows from policy engine 260*b* to provisioning layer 265 to the router 245), to route the first SIP data or SIP request 295 from the source address 215 along modified IP path 270 to a selected one (in this case, security DPI engine 275*n*) of the security DPI engines 275*a*-275*n*. In such a case, the routing updates are constructed such that (i) latency is minimized, (ii) available capacity of the security DPI engine is taken into account, and (iii) there is no single points of failure, or the like. To meet these conditions, the selected security DPI engine 275*n* may be the security DPI engine that is physically closest to destination address 235. Alternatively, to meet these conditions, the selected security DPI engine 275*n* may be not be the nearest one to the destination address 235, but may be selected because network connections between the selected security DPI engine 275*n* may provide from lower latency, the security DPI engine 275*b* that is physically closest to destination address 235 may lack the necessary capacity for performing a deep scan, and/or selecting the security DPI engine 275*b* that is physically closest to the destination address 235 may result in a single point of failure, or the like.

The selected security DPI engine 275*n* may perform a deep scan of the received first SIP data or SIP request 295 to identify any known fraudulent or malicious attack vectors contained within the received first SIP data or SIP request 295 and to determine whether the calling party is a known malicious entity or whether the source address is associated with a known malicious entity.

Turning to FIG. 2C, in the case that the deep scan of the received first SIP data or SIP request 295 does not reveal or identify any known fraudulent or malicious attack vectors contained within the received first SIP data or SIP request 295, does not reveal or identify the calling party as a known malicious entity, and/or or does not reveal or identify the source address as being associated with a known malicious entity, then the selected security DPI engine 275*n* may establish a media communication session along original IP path 255 between the calling party 210 and the called party 230, in some cases, by routing the first SIP data or SIP request 295 along return IP path 285 and via router 250 to the called party 230. In some embodiments, establishing the media communication session may comprise the selected security DPI engine 275*n* either (A) directly sending routing updates to one or more routers 245 and/or 250, via provisioning layer 265 of the network(s) 240 (depicted in FIG. 1 by the solid arrows from security DPI engine 175 to provisioning layer 165 to the routers 145 and 150) or (B) indirectly communicating with computing system 260 and/or policy engine 260*b* to send routing updates to one or more routers 245 and/or 250, via provisioning layer 265 of the network(s) 240 (depicted in FIG. 1 by the short dash line between security DPI engine 175*a* and data collection engine 160*a* of computing system 160 and by the solid arrows from policy engine 160*b* to provisioning layer 165 to the routers 145*a* and 150*a*), to correspondingly establish the media communication session along the original IP path 255. Alternatively, the selected security DPI engine 275*n* may route the first SIP data or SIP request 295 along return IP path 285 and via router 250 to the called party 230, by either (C) directly sending routing updates to router 250, via provisioning layer 265 of the network(s) 240 (depicted in FIG. 2C by the solid arrows from security DPI engine 275*n* to provisioning layer 265 to the router 250) or (D) indirectly communicating with computing system 260 and/or policy engine 260*b* to send routing updates to router 250, via provisioning layer 265 of the network(s) 240 (depicted in FIG. 1 by the short dash line between security DPI engine 175*a* and data collection engine 160*a* of computing system 160 and by the solid arrows from policy engine 160*b* to provisioning layer 165 to the router 150*a*)

Figure 3:
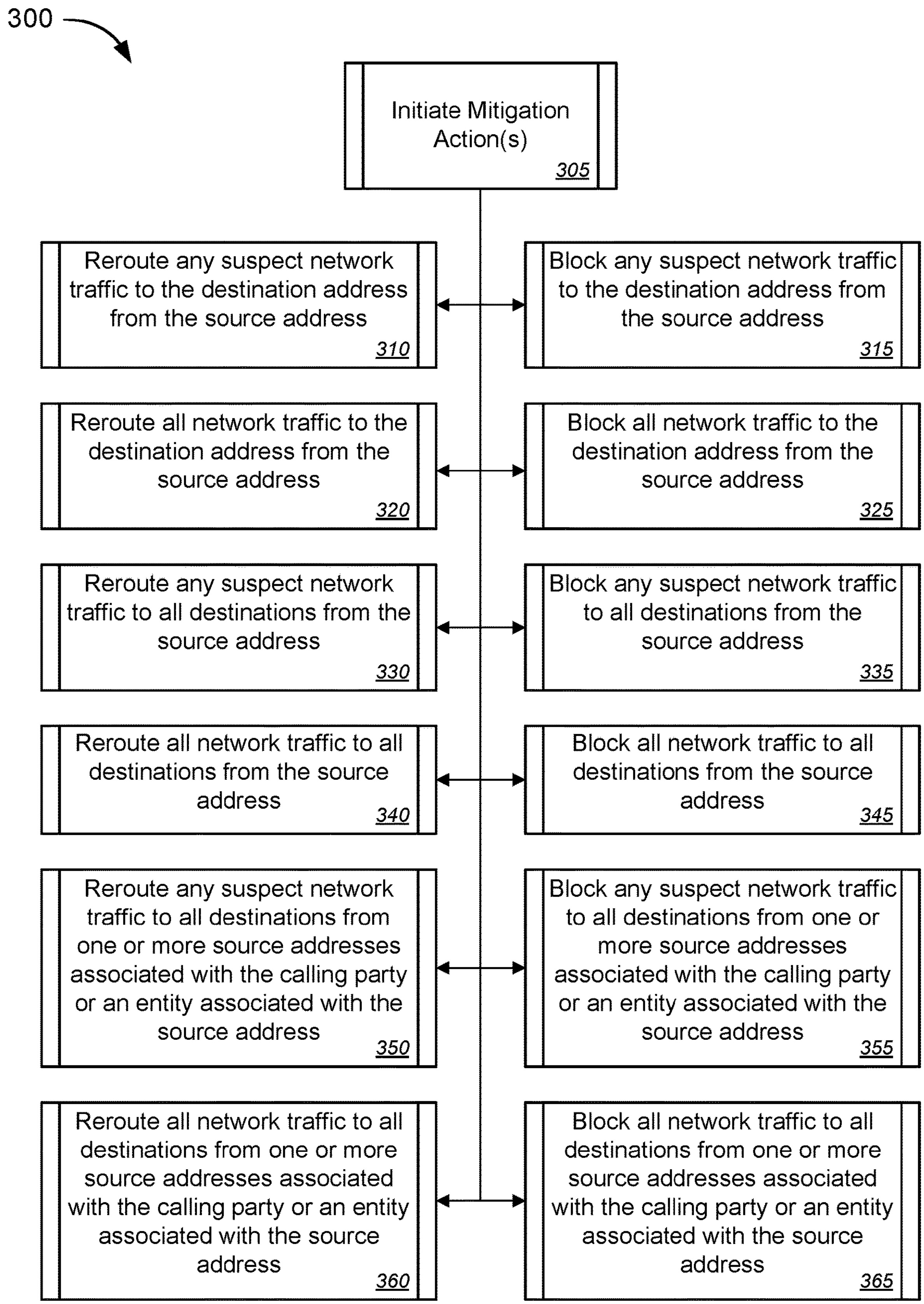
FIG. 3 is a schematic diagram illustrating a non-limiting example of various mitigation actions may be initiated when implementing the fraud or DDoS protection for SIP-based communication, in accordance with various embodiments.

On the other hand, with reference to FIG. 2D, in the case that the deep scan of the received first SIP data or SIP request 295 reveals or identifies at least one known fraudulent or malicious attack vector contained within the received first SIP data or SIP request 295, then the selected security DPI engine 275*n* may initiate one or more mitigation actions (which is described above with respect to FIG. 1 and as shown in the non-limiting list provided in FIG. 3, for instance).

In some embodiments, at least one of identifying any known fraudulent or malicious attack vectors contained within the received first SIP data or SIP request 295, determining whether the calling party is a known malicious entity or whether the source address is associated with a known malicious entity, or initiating the one or more mitigation actions, and/or the like, may be performed using at least in part machine learning engine 280*a* (and corresponding database(s) 280*b*).

Turning to FIG. 2E, computing system 260, policy engine 260*b*, and/or security DPI engine 275*n* may normalize all network traffic to the destination address 235 (e.g., from source address 215) either after a predetermined period (e.g., a set number of days, a set number of weeks, a set number of months, or longer, etc.) and/or after a predetermined number of SIP data checks (e.g., 5, 10, 15, 20, 25, 30, 35, 40, 45, 50, or more, etc.) showing no abnormalities indicative of potential fraudulent or malicious actions.

Merely by way of example, in some cases, computing system 260 and/or security DPI engine 275*n* may send a report to a system log(s) or network log(s) 290 in response to at least one of: rerouting the first SIP data or SIP request 295 to the security DPI engine (as shown in FIG. 2B), performing the deep scan of the received first SIP (as shown in FIGS. 2B-2D), initiating the one or more mitigation actions (as shown in FIG. 2D), recording an event to the machine learning engine (not shown in FIG. 2), or normalizing the network traffic to the destination address (as shown in FIG. 2E), and/or the like.

FIG. 3 is a schematic diagram illustrating a non-limiting example 300 of various mitigation actions may be initiated when implementing the fraud or DDoS protection for SIP-based communication, in accordance with various embodiments.

As shown in the non-limiting example 300 of FIG. 3, initiating mitigation action(s) 305 (such as the mitigations actions described with respect to FIGS. 1, 2, and 4) may include, but is (are) not limited to, at least one of: rerouting any suspect network traffic to the destination address from the source address (block 310); blocking any suspect network traffic to the destination address from the source address (block 315); rerouting all network traffic to the destination address from the source address (block 320); blocking all network traffic to the destination address from the source address (block 325); rerouting any suspect network traffic to all destinations from the source address (block 330); blocking any suspect network traffic to all destinations from the source address (block 335); rerouting all network traffic to all destinations from the source address (block 340); blocking all network traffic to all destinations from the source address (block 345); rerouting any suspect network traffic to all destinations from one or more source addresses associated with the calling party or associated with an entity associated with the source address (block 350); blocking any suspect network traffic to all destinations from one or more source addresses associated with the calling party or associated with an entity associated with the source address (block 355); rerouting all network traffic to all destinations from one or more source addresses associated with the calling party or associated with the entity associated with the source address (block 360); blocking all network traffic to all destinations from one or more source addresses associated with the calling party or associated with the entity associated with the source address (block 365); and/or the like.

FIGS. 4A-4D (collectively, "FIG. 4") are flow diagrams illustrating a method 400 for implementing fraud or DDoS protection for SIP-based communication, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
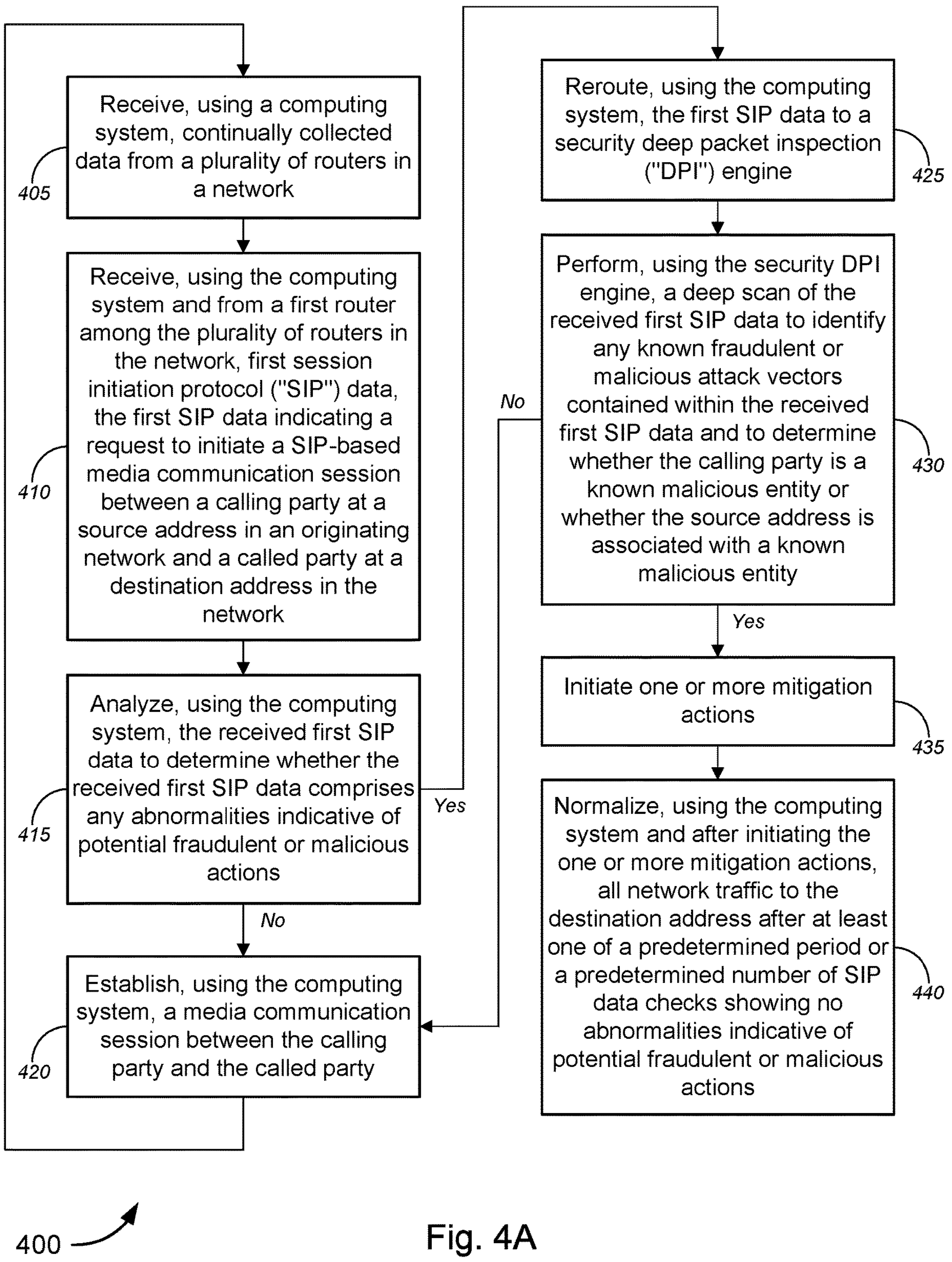
FIGS. 4A-4D are flow diagrams illustrating a method for implementing fraud or DDoS protection for SIP-based communication, in accordance with various embodiments.

In the non-limiting embodiment of FIG. 4A, method 400, at block 405, may comprise receiving, using a computing system, continually collected data from a plurality of routers in a network. According to some embodiments, the computing system may include, without limitation, at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC, and/or the like. In some instances, each of the plurality of routers may employ active data collection to collect network traffic data. The collected network traffic data may include, but is not limited to, SIP data and non-SIP data, and each of the plurality of routers provides the SIP data as the continually collected data to the computing system, where continually collecting data from the plurality of routers in the network comprises receiving the SIP data from each router in a continual, periodic, or sporadic manner, or the like.

At block 410, the method 400 may comprise receiving, using the computing system and from a first router among the plurality of routers in the network, first session initiation protocol ("SIP") data, the first SIP data indicating a request to initiate a SIP-based media communication session between a calling party at a source address in an originating network and a called party at a destination address in the network. In some cases, the network and the originating network may be the same network (operated by the same service provider). Alternatively, the network and the originating network may be different networks (either operated by the same service provider or operated by different service providers). In some embodiments, the SIP-based communication may include, without limitation, at least one of a voice over Internet Protocol ("VoIP") call, an IP-based video call, or an instant message over IP, and/or the like.

Method 400 may further comprise, at block 415, analyzing, using the computing system, the received first SIP data to determine whether the received first SIP data comprises any abnormalities indicative of potential fraudulent or malicious actions. If not, method 400 would continue to the process at block 420. If so, method 400 would continue to the process at block 425. According to some embodiments, analyzing the received first SIP data may comprise analyzing, using the computing system, the received first SIP data based at least in part on information regarding packets sent from the source address, to determine whether the received first SIP data comprises any abnormalities indicative of potential fraudulent or malicious actions, where the information regarding packets sent from the source address may comprise information including at least one of packet sizes of packets sent from the source address, frequency of packets sent from the source address, or types of packets sent from the source address, and/or the like. In some instances, the potential fraudulent or malicious actions may include, but are not limited to, at least one of one or more attacks to obtain fraudulent access, one or more denial of service ("DoS") attacks, one or more distributed denial of service ("DDos") attacks, or one or more user datagram protocol ("UDP") attacks, and/or the like.

At block 420, method 400 may comprise, based on a determination that the received first SIP data does not comprise at least one abnormality indicative of potential fraudulent or malicious actions, establishing, using the computing system, a media communication session between the calling party and the called party. Method 400 then returns to the process at block 405.

Alternatively, at block 425, method 400 may comprise, based on a determination that the received first SIP data comprises at least one abnormality indicative of potential fraudulent or malicious actions, rerouting, using the computing system, the first SIP data to a security deep packet inspection ("DPI") engine. In some embodiments, rerouting the first SIP data to the security DPI engine may comprise sending, using the computing system, routing updates to one or more routers, via a provisioning layer of the network, to route the first SIP data from the source address, where the routing updates are constructed such that (i) latency is minimized, (ii) available capacity of the security DPI engine is taken into account, and (iii) there is no single points of failure, or the like. According to some embodiments, the computing system may comprise a data collection engine and a policy engine, where receiving the first SIP data (at block 410) may be performed by the data collection engine, and where analyzing and rerouting the received first SIP data (at blocks 415 and 425) may be performed by the policy engine.

Method 400 may further comprise performing, using the security DPI engine, a deep scan of the received first SIP data to identify any known fraudulent or malicious attack vectors contained within the received first SIP data and to determine whether the calling party is a known malicious entity or whether the source address is associated with a known malicious entity. If the deep scan of the received first SIP data does not reveal or identify any known fraudulent or malicious attack vectors contained within the received first SIP data, does not reveal or identify the calling party as a known malicious entity, and/or or does not reveal or identify the source address as being associated with a known malicious entity, then method 400 would proceed to the process at block 420 (which would then follow the processes as described above). On the other hand, if the deep scan of the received first SIP data reveals or identifies at least one known fraudulent or malicious attack vectors contained within the received first SIP data, then method 400 would continue to the process at block 435. If the deep scan of the received first SIP data reveals or identifies the calling party as a known malicious entity and/or or reveals or identifies the source address as being associated with a known malicious entity, the method 400 may also continue to the process at block 435.

At block 435, method 400 may comprise initiating one or more mitigation actions, a non-limiting list of which is provided in FIG. 3, for instance. In some embodiments, at least one of identifying any known fraudulent or malicious attack vectors contained within the received first SIP data (at block 430), determining whether the calling party is a known malicious entity or whether the source address is associated with a known malicious entity (also at block 430), or initiating the one or more mitigation actions (at block 435), and/or the like, may be performed using at least in part a machine learning engine.

Method 400 may further comprise normalizing, using the computing system and after initiating the one or more mitigation actions, all network traffic to the destination address after at least one of a predetermined period or a predetermined number of SIP data checks showing no abnormalities indicative of potential fraudulent or malicious actions (block 440).

Figure 4B:
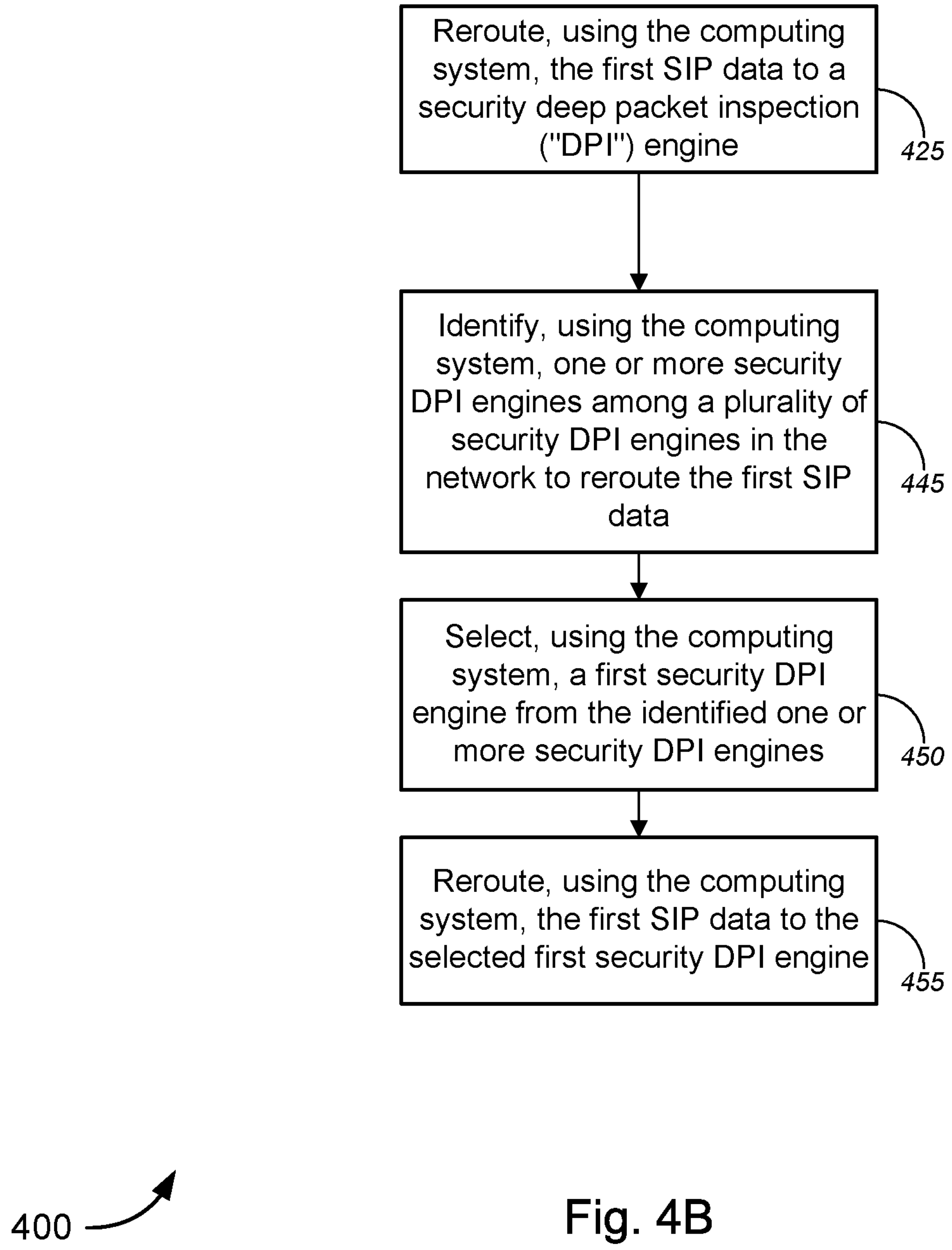

Turning to FIG. 4B, rerouting the first SIP data to the security DPI engine (at block 425) may comprise: identifying, using the computing system, one or more security DPI engines among a plurality of security DPI engines in the network to reroute the first SIP data (block 445); selecting, using the computing system, a first security DPI engine from the identified one or more security DPI engines, based at least in part on at least one of proximity of each of the one or more security DPI engines to the destination address, latency caused by rerouting data to each of the one or more security DPI engines, available capacity of each of the one or more security DPI engines, or identification of points of failure due to selection of each of the one or more security DPI engines, and/or the like (block 450); and rerouting, using the computing system, the first SIP data to the selected first security DPI engine (block 455).

Figure 4C:
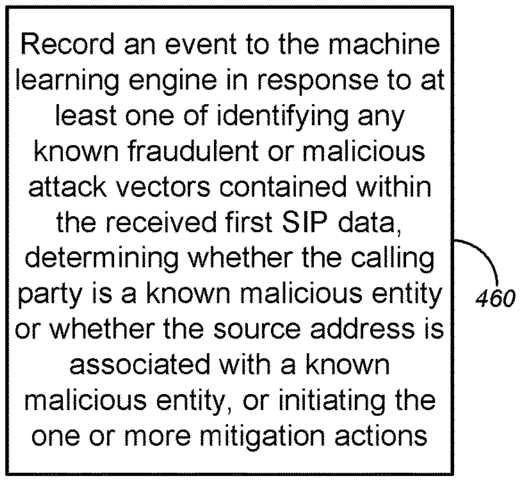

Referring to FIG. 4C, method 400 may further comprise, at block 460, recording an event to the machine learning engine in response to at least one of identifying any known fraudulent or malicious attack vectors contained within the received first SIP data (at block 430), determining whether the calling party is a known malicious entity or whether the source address is associated with a known malicious entity (also at block 430), or initiating the one or more mitigation actions (at block 435), and/or the like.

Figure 4D:
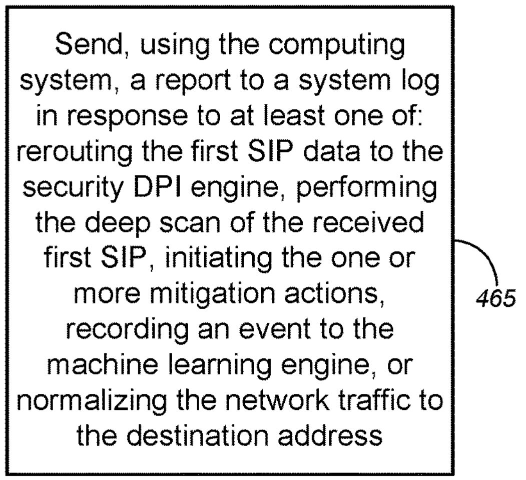

With reference to FIG. 4D, method 400 may further comprise, at block 465, sending, using the computing system, a report to a system log in response to at least one of: rerouting the first SIP data to the security DPI engine (at block 425), performing the deep scan of the received first SIP (at block 430), initiating the one or more mitigation actions (at block 435), recording an event to the machine learning engine (at block 460), or normalizing the network traffic to the destination address (at block 440), and/or the like.

Exemplary System and Hardware Implementation

Figure 5:
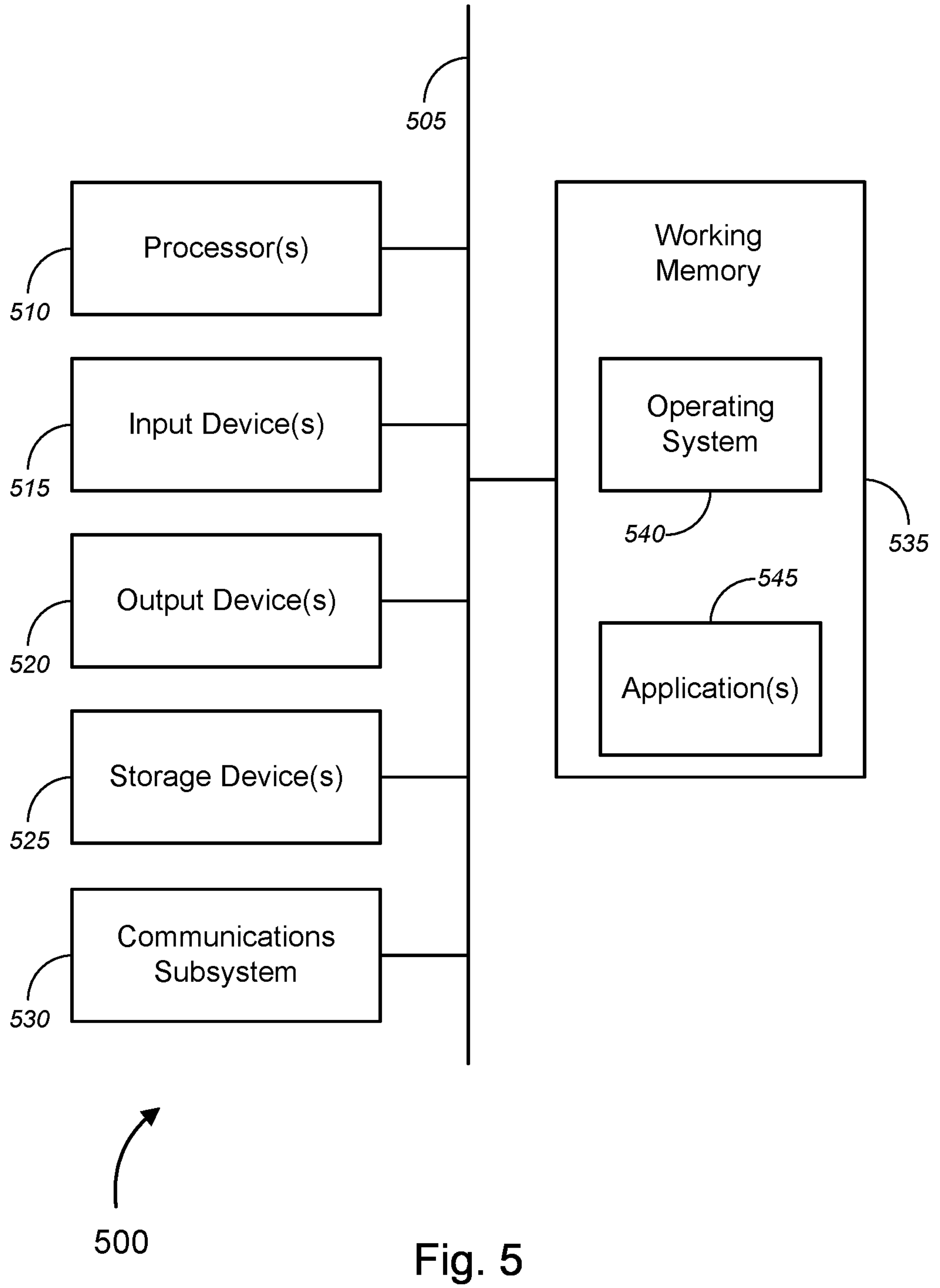
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., calling devices 105, 105*a*-105*e*, and 205, called devices 125, 125*a*-125*e*, and 225, routers 145*a*-145*n*, 150*a*-150*n*, 245, and 250, computing systems 160 and 260, data collection engines 160*a* and 260*a*, policy engines 160*b* and 260*b*, provisioning layers 165 and 265, security deep packet inspection ("DPI") engines 175, 175*a*-175*n*, and 275*a*-275*n*, machine learning engines 180*a* and 280*a*, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., calling devices 105, 105*a*-105*e*, and 205, called devices 125, 125*a*-125*e*, and 225, routers 145*a*-145*n*, 150*a*-150*n*, 245, and 250, computing systems 160 and 260, data collection engines 160*a* and 260*a*, policy engines 160*b* and 260*b*, provisioning layers 165 and 265, security DPI engines 175, 175*a*-175*n*, and 275*a*-275*n*, machine learning engines 180*a* and 280*a*, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
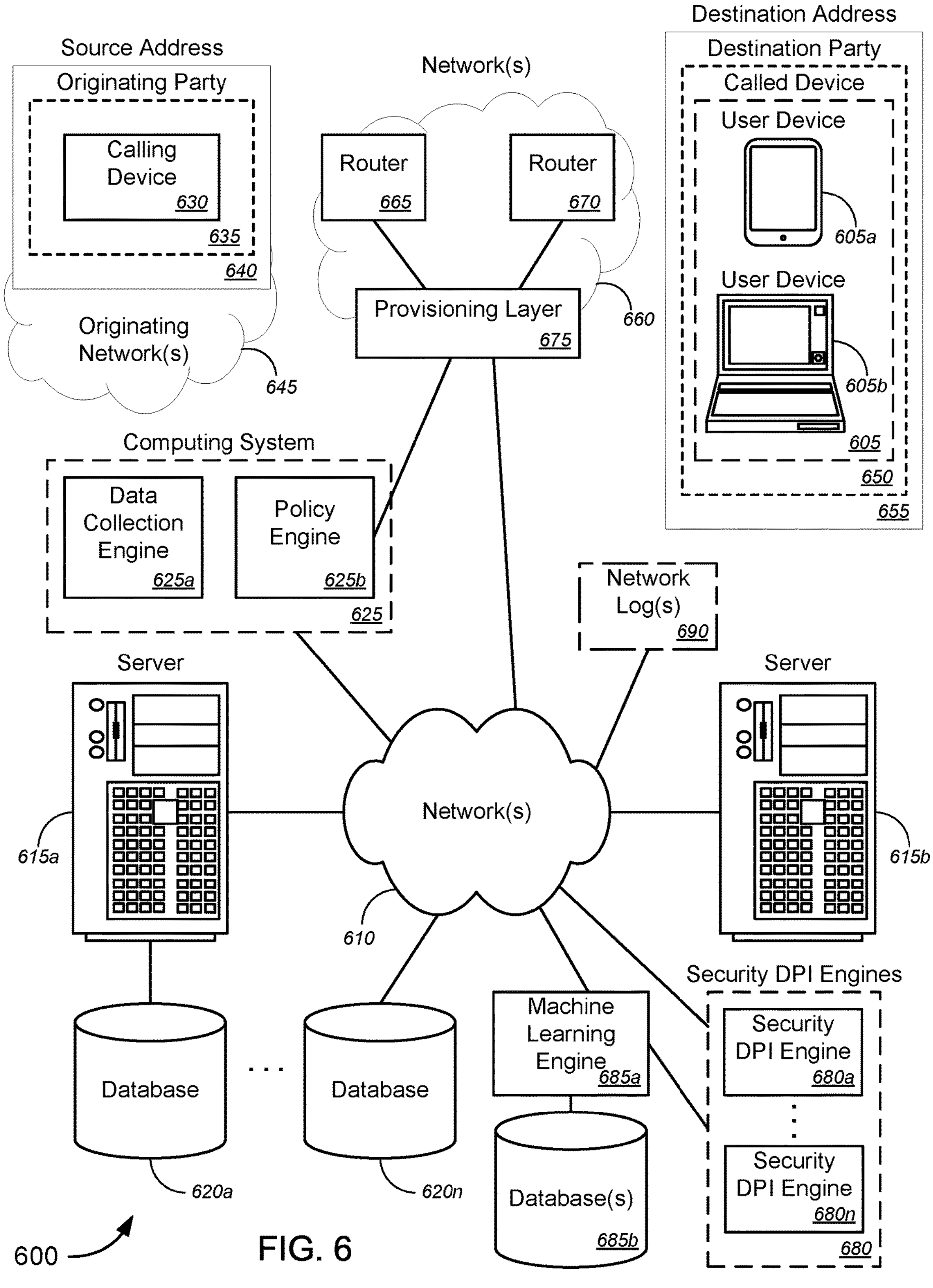
FIG. 6 is a block diagram illustrating a networked system of computers, computing systems, or system hardware architecture, which can be used in accordance with various embodiments.

As noted above, a set of embodiments comprises methods and systems for implementing call or data routing, and, more particularly, to methods, systems, and apparatuses for implementing fraud or distributed denial of service ("DDoS") protection for session initiation protocol ("SIP")-based communication. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to networks 120, 140, 220, and 240 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing call or data routing, and, more particularly, to methods, systems, and apparatuses for implementing fraud or distributed denial of service ("DDoS") protection for session initiation protocol ("SIP")-based communication, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* might reside on a storage medium local to (and/or resident in) a server 615*a* (and/or a user computer, user device, or customer device 605). Alternatively, a database 620*n* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 160 and 260 of FIGS. 1 and 2, or the like), which may comprise data collection engine 625*a* (similar to data collection engines 160*a* and 260*a* of FIGS. 1 and 2, or the like) and policy engine 625*b* (similar to policy engines 160*b* and 260*b* of FIGS. 1 and 2, or the like), or the like. System 600 may further comprise a calling device 630 (similar to calling devices 105, 105*a*-105*e*, and 205 of FIGS. 1 and 2, or the like) that is associated with an originating party 635 (similar to originating party 110*a*-110*n* or 210 of FIGS. 1 and 2, or the like) at a source address 640 (similar to source addresses 115*a*-115*n* and 215 of FIGS. 1 and 2, or the like) in originating network(s) 645 (similar to originating networks 120 and 220 of FIGS. 1 and 2, or the like), a called device 605 (including user devices 605*a* and 605*b*, or the like; similar to called devices 125, 125*a*-125*e*, and 225 of FIGS. 1 and 2, or the like) that is associated with a destination party 650 (similar to destination party 130*a*-130*n* or 230 of FIGS. 1 and 2, or the like) at a destination address 655 (similar to destination addresses 135*a*-135*n* and 235 of FIGS. 1 and 2, or the like) in network(s) 660 (similar to networks 140 and 240 of FIGS. 1 and 2, or the like). System 600 may further comprise router 665 (similar to routers 145*a*-145*n* and 245 of FIGS. 1 and 2, or the like), router 670 (similar to routers 150*a*-150*n* and 250 of FIGS. 1 and 2, or the like), and provisioning layer 675 (similar to provisioning layers 165 and 265 of FIGS. 1 and 2, or the like), each disposed in network(s) 660. System 600 may further comprise one or more security deep packet inspection ("DPI") engines 680 or 680*a*-680*n* (similar to security DPI engines 175, 175*a*-175*n*, and 275*a*-275*n* of FIGS. 1 and 2, or the like), machine learning engine 685*a* and corresponding database(s) 685*b* (similar to machine learning engines 180*a* and 280*a* and corresponding database(s) 180*b* and 280*b* of FIGS. 1 and 2, or the like), and one or more network logs 690 (similar to network log(s) 190 of FIGS. 1 and 2, or the like).

In operation, each of routers 665 and 670 may employ active data collection to continually, periodically, or sporadically collect network traffic data, which may include, but is not limited to SIP data and non-SIP data. Computing system 625 and/or data collection engine 625*a* of computing system 625 may continually collect data from the plurality of routers 665 and 670, by receiving SIP data from the plurality of routers 665 and 670 in a continual, periodic, or sporadic manner. In some cases, computing system 625 and/or data collection engine 625*a* may continually collect data from one or more of the plurality of security DPI engines 680*a*-680*n*.

Computing system 625 and/or data collection engine 625*a* may receive, from a first router 665 in network(s) 660, first SIP data, the first SIP data indicating a request to initiate a SIP-based media communication session between a calling party or originating party 635 at a source address 640 in originating network(s) 645 and a called party or destination party 650 at a destination address 655 in the network(s) 660. In some embodiments, the SIP-based media communication may include, without limitation, at least one of a voice over Internet Protocol ("VoIP") call, an IP-based video call, or an instant message over IP, and/or the like. In some cases, the network(s) 660 and the originating network(s) 645 may be the same network (operated by the same service provider). Alternatively, the network(s) 660 and the originating network(s) 645 may be different networks (either operated by the same service provider or operated by different service providers). Although not shown in FIG. 6, one or more session border controllers ("SBCs") may be deployed to protect network(s) 660 and may be disposed between originating network(s) 645 and network(s) 660, particularly in the case that originating network(s) 645 and network(s) 660 are different network(s) and/or operated by different service providers. In the case that the destination address 655 is part of a customer network (e.g., local area network ("LAN") or the like), one or more other SBCs may also be deployed to protect network(s) 660 and may be disposed between network(s) 660 and the customer network (also not shown in FIG. 6).

Computing system 625 and/or policy engine 625*b* of computing system 625 may analyze the received first SIP data to determine whether the received first SIP data comprises any abnormalities indicative of potential fraudulent or malicious actions. According to some embodiments, analyzing the received first SIP data may comprise analyzing the received first SIP data based at least in part on information regarding packets sent from the source address, to determine whether the received first SIP data comprises any abnormalities indicative of potential fraudulent or malicious actions, where the information regarding packets sent from the source address may comprise information including at least one of packet sizes of packets sent from the source address, frequency of packets sent from the source address, or types of packets sent from the source address, and/or the like. In some instances, the potential fraudulent or malicious actions may include, but are not limited to, at least one of one or more attacks to obtain fraudulent access, one or more denial of service ("DoS") attacks, one or more distributed denial of service ("DDos") attacks, or one or more user datagram protocol ("UDP") attacks (which may be a form of volumetric DDoS attack), and/or the like.

Based on a determination that the received first SIP data does not comprise at least one abnormality indicative of potential fraudulent or malicious actions, computing system 625 and/or policy engine 625*b* may establish a media communication session along an original Internet Protocol ("IP") path between the calling party 635 and the called party 650. On the other hand, based on a determination that the received first SIP data comprises at least one abnormality indicative of potential fraudulent or malicious actions, computing system 625 and/or policy engine 625*b* may reroute the first SIP data to a security DPI engine 680. In some embodiments, establishing the media communication session or rerouting the first SIP data to the security DPI engine may comprise computing system 625 and/or policy engine 625*b* sending routing updates to router 665 and/or router 670, via provisioning layer 675 of the network(s) 660, to correspondingly establish the media communication session along the original IP path 155*a* or route the first SIP data from the source address 640 along a modified IP path to a selected one of the security DPI engines 680*a*-680*n* (e.g., security DPI engine 680*a*). In at least the latter case, the routing updates are constructed such that (i) latency is minimized, (ii) available capacity of the security DPI engine is taken into account, and (iii) there is no single points of failure, or the like. To meet these conditions, the selected security DPI engine 680*a* may be the security DPI engine that is physically closest to destination address 655. Alternatively, to meet these conditions, the selected security DPI engine 680*a* may be not be the nearest one to the destination address 655, but may be selected because network connections between the selected security DPI engine 680*a* may provide from lower latency, the security DPI engine 680*b* that is physically closest to destination address 655 may lack the necessary capacity for performing a deep scan, and/or selecting the security DPI engine 680*b* that is physically closest to the destination address 655 may result in a single point of failure, or the like.

The selected security DPI engine 680*a* may perform a deep scan of the received first SIP data to identify any known fraudulent or malicious attack vectors contained within the received first SIP data and to determine whether the calling party is a known malicious entity or whether the source address is associated with a known malicious entity.

In the case that the deep scan of the received first SIP data does not reveal or identify any known fraudulent or malicious attack vectors contained within the received first SIP data, does not reveal or identify the calling party as a known malicious entity, and/or or does not reveal or identify the source address as being associated with a known malicious entity, then the selected security DPI engine 680*a* may establish a media communication session along original IP path 155*a* between the calling party 635 and the called party 650, in some cases, by routing the first SIP data or SIP request along a return IP path and via router 670 to the called party 650. In some embodiments, establishing the media communication session may comprise the selected security DPI engine 680*a* either (A) directly sending routing updates to one or more routers 665-665*n* and/or 670-670*n*, via provisioning layer 675 of the network(s) 660 or (B) indirectly communicating with computing system 625 and/or policy engine 625*b* to send routing updates to one or more routers 665-665*n* and/or 670-670*n*, via provisioning layer 675 of the network(s) 660, to correspondingly establish the media communication session along the original IP path.

On the other hand, in the case that the deep scan of the received first SIP data reveals or identifies at least one known fraudulent or malicious attack vector contained within the received first SIP data, then the selected security DPI engine 680*a* may initiate one or more mitigation actions (which is shown in the non-limiting list provided in FIG. 3, for instance).

In some embodiments, at least one of identifying any known fraudulent or malicious attack vectors contained within the received first SIP data, determining whether the calling party is a known malicious entity or whether the source address is associated with a known malicious entity, or initiating the one or more mitigation actions, and/or the like, may be performed using at least in part machine learning engine 685*a* (and corresponding database(s) 685*b*).

According to some embodiments, computing system 625, policy engine 625*b*, and/or security DPI engine 680*a* may normalize all network traffic to the destination address 655 (e.g., from source address 640) either after a predetermined period (e.g., a set number of days, a set number of weeks, a set number of months, or longer, etc.) and/or after a predetermined number of SIP data checks (e.g., 5, 10, 15, 20, 25, 30, 35, 40, 45, 50, or more, etc.) showing no abnormalities indicative of potential fraudulent or malicious actions.

Merely by way of example, in some cases, computing system 625 and/or security DPI engine 680*a* may send a report to a system log(s) or network log(s) 690 in response to at least one of: rerouting the first SIP data to the security DPI engine, performing the deep scan of the received first SIP, initiating the one or more mitigation actions, recording an event to the machine learning engine, or normalizing the network traffic to the destination address, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, using a computing system and from a first router among a plurality of routers in a network, first session initiation protocol ("SIP") data, the first SIP data indicating a request to initiate a SIP-based media communication session between a calling party at a source address in an originating network and a called party at a destination address in the network;

analyzing, using the computing system, the received first SIP data to determine whether the received first SIP data comprises any abnormalities indicative of potential fraudulent or malicious actions;

based on a determination that the received first SIP data comprises at least one abnormality indicative of potential fraudulent or malicious actions, rerouting, using the computing system, the received first SIP data to a security deep packet inspection ("DPI") engine;

performing, using the security DPI engine, a deep scan of the received first SIP data to identify any known fraudulent or malicious attack vectors contained within the received first SIP data and to determine whether the calling party is a known malicious entity or whether the source address is associated with a known malicious entity; and in response to the security DPI engine identifying at least one known fraudulent or malicious attack vector contained within the received first SIP data, initiating one or more mitigation actions.

2. The method of claim 1, wherein the computing system comprises at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC.

3. The method of claim 1, wherein the SIP-based communication comprises at least one of a voice over Internet Protocol ("VoIP") call, an IP-based video call, or an instant message over IP.

4. The method of claim 1, further comprising:

receiving, using the computing system, continually collected data from the plurality of routers in the network;

wherein continually collecting data from the plurality of routers in the network comprises receiving the first SIP data from the first router in a continual, periodic, or sporadic manner.

5. The method of claim 4, wherein each of the plurality of routers employ active data collection to collect network traffic data, wherein the collected network traffic data comprises SIP data and non-SIP data, and wherein each of the plurality of routers provides the SIP data as the continually collected data to the computing system.

6. The method of claim 1, wherein analyzing the received first SIP data comprises analyzing, using the computing system, the received first SIP data based at least in part on information regarding packets sent from the source address, to determine whether the received first SIP data comprises any abnormalities indicative of potential fraudulent or malicious actions, wherein the information regarding packets sent from the source address comprises information including at least one of packet sizes of packets sent from the source address, frequency of packets sent from the source address, or types of packets sent from the source address.

7. The method of claim 1, wherein the potential fraudulent or malicious actions comprise at least one of one or more attacks to obtain fraudulent access, one or more denial of service ("DoS") attacks, one or more distributed denial of service ("DDos") attacks, or one or more user datagram protocol ("UDP") attacks.

8. The method of claim 1, wherein rerouting the first SIP data to the security DPI engine comprises:

identifying, using the computing system, one or more security DPI engines among a plurality of security DPI engines in the network to reroute the received first SIP data;

selecting, using the computing system, a first security DPI engine from the identified one or more security DPI engines, based at least in part on at least one of proximity of each of the one or more security DPI engines to the destination address, latency caused by rerouting data to each of the one or more security DPI engines, available capacity of each of the one or more security DPI engines, or identification of points of failure due to selection of each of the one or more security DPI engines; and rerouting, using the computing system, the received first SIP data to the selected first security DPI engine.

9. The method of claim 1, wherein the computing system comprises a data collection engine and a policy engine, wherein the receiving the first SIP data is performed by the data collection engine, and wherein analyzing and rerouting the received first SIP data are performed by the policy engine.

10. The method of claim 1, wherein the one or more mitigation actions comprises at least one of:

rerouting or blocking any suspect network traffic to the destination address from the source address;

rerouting or blocking all network traffic to the destination address from the source address;

rerouting or blocking any suspect network traffic to all destinations from the source address;

rerouting or blocking all network traffic to all destinations from the source address;

rerouting or blocking any suspect network traffic to all destinations from one or more source addresses associated with the calling party or associated with an entity associated with the source address; or rerouting or blocking all network traffic to all destinations from one or more source addresses associated with the calling party or associated with the entity associated with the source address.

11. The method of claim 1, wherein at least one of identifying any known fraudulent or malicious attack vectors contained within the received first SIP data, determining whether the calling party is a known malicious entity or whether the source address is associated with a known malicious entity, or initiating the one or more mitigation actions is performed using at least in part a machine learning engine.

12. The method of claim 11, further comprising:

recording an event to the machine learning engine in response to at least one of identifying any known fraudulent or malicious attack vectors contained within the received first SIP data, determining whether the calling party is a known malicious entity or whether the source address is associated with a known malicious entity, or initiating the one or more mitigation actions.

13. A system, comprising:

a computing system, comprising:

a data collection engine;

a policy engine;

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive, using the data collection engine and from a first router among a plurality of routers in a network, first session initiation protocol ("SIP") data, the first SIP data indicating a request to initiate a SIP-based media communication session between a calling party at a source address in an originating network and a called party at a destination address in the network;

analyze, using the policy engine, the received first SIP data to determine whether the received first SIP data comprises any abnormalities indicative of potential fraudulent or malicious actions; and based on a determination that the received first SIP data comprises at least one abnormality indicative of potential fraudulent or malicious actions, rerouting, using the policy engine, the received first SIP data to a first security deep packet inspection ("DPI") engine among a plurality of security DPI engines; and the first security DPI engine, comprising:

at least one second processor; and a second non-transitory computer readable medium communicatively coupled to the at least one second processor, the second non-transitory computer readable medium having stored thereon computer software comprising a second set of instructions that, when executed by the at least one second processor, causes the first security DPI engine to:

perform a deep scan of the received first SIP data to identify any known fraudulent or malicious attack vectors contained within the received first SIP data and to determine whether the calling party is a known malicious entity or whether the source address is associated with a known malicious entity; and in response to the security DPI engine identifying at least one known fraudulent or malicious attack vector contained within the received first SIP data, initiating one or more mitigation actions.

14. The system of claim 13, wherein the computing system comprises at least one of a call server, a call controller, a call manager, a media gateway controller, a video call server, an instant messaging server, a network operations center ("NOC"), a centralized call server, a centralized call controller, a centralized call manager, a centralized media gateway controller, a centralized video call server, a centralized instant messaging server, a distributed computing-based call server, a distributed computing-based call controller, a distributed computing-based call manager, a distributed computing-based media gateway controller, a distributed computing-based video call server, a distributed computing-based instant messaging server, or a distributed computing-based NOC.

15. The system of claim 13, wherein the one or more mitigation actions comprises at least one of:

rerouting or blocking any suspect network traffic to the destination address from the source address;

rerouting or blocking all network traffic to the destination address from the source address;

rerouting or blocking any suspect network traffic to all destinations from the source address;

rerouting or blocking all network traffic to all destinations from the source address;

rerouting or blocking any suspect network traffic to all destinations from one or more source addresses associated with the calling party or associated with an entity associated with the source address; or rerouting or blocking all network traffic to all destinations from one or more source addresses associated with the calling party or associated with the entity associated with the source address.

16. The system of claim 13, wherein at least one of identifying any known fraudulent or malicious attack vectors contained within the received first SIP data, determining whether the calling party is a known malicious entity or whether the source address is associated with a known malicious entity, or initiating the one or more mitigation actions is performed using at least in part a machine learning engine.

* * * * *